(12) United States Patent
Morikawa

(10) Patent No.: US 8,503,050 B2
(45) Date of Patent: Aug. 6, 2013

(54) IMAGE READING APPARATUS AND IMAGE FORMING APPARATUS

(75) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 12/609,114

(22) Filed: Oct. 30, 2009

(65) Prior Publication Data

US 2010/0118358 A1 May 13, 2010

(30) Foreign Application Priority Data

Nov. 13, 2008 (JP) .................................. 2008-291499

(51) Int. Cl.
*H04N 1/46* (2006.01)
*H04N 1/40* (2006.01)
*H04N 1/04* (2006.01)

(52) U.S. Cl.
USPC ........... 358/505; 358/509; 358/512; 358/513; 358/514; 358/474; 358/475; 358/461; 358/482; 358/483

(58) Field of Classification Search
USPC ................. 358/474, 475, 461, 465, 482, 483, 358/445, 505, 509, 512–514; 250/234–236, 250/208.1, 216; 359/850–853
See application file for complete search history.

(56) References Cited

U.S. PATENT DOCUMENTS

| | | | |
|---|---|---|---|
| 4,984,013 A | 1/1991 | Terashita | 355/38 |
| 5,671,060 A | 9/1997 | Takahashi et al. | 356/405 |
| 7,170,643 B2 * | 1/2007 | Matsui et al. | 358/3.26 |
| 7,376,264 B2 | 5/2008 | Loce et al. | 382/162 |
| 7,414,761 B2 * | 8/2008 | Tochigi et al. | 358/483 |
| 2004/0066544 A1 | 4/2004 | Suga et al. | 358/509 |
| 2008/0088887 A1 | 4/2008 | Morikawa | 358/447 |
| 2008/0278779 A1 | 11/2008 | Nishina et al. | 358/518 |
| 2010/0103455 A1 | 4/2010 | Morikawa | 358/1.151 |
| 2010/0157375 A1 | 6/2010 | Murakami et al. | 358/3.26 |
| 2011/0080626 A1 * | 4/2011 | Morikawa | 358/509 |

FOREIGN PATENT DOCUMENTS

| | | | |
|---|---|---|---|
| JP | 02248074 A | * | 10/1990 |
| JP | 3-113961 | | 5/1991 |
| JP | 2003-87503 | | 3/2003 |
| JP | 2004-126448 | | 4/2004 |

OTHER PUBLICATIONS

"How to Measure MTF and other Properties of Lenses", Optikos Corporation, Rev. 2.0, Jul. 16, 1999, pp. 1-64.
Z. Ye et al.: "Analysis of Spectral Characteristics Among Different Sensors by Use of Simulated RS Images", Geo-spatial Information Science, vol. 3, No. 2, Jun. 2000, pp. 35-40.
"Photometry (optics)", Wikipedia, the free encyclopedia, version dated Oct. 23, 2007.

* cited by examiner

*Primary Examiner* — Cheukfan Lee
(74) *Attorney, Agent, or Firm* — Fitzpatrick, Cella, Harper & Scinto

(57) ABSTRACT

An optical filter is provided on photoelectric conversion elements for monochrome reading. Each of a reflecting optical system and the optical filter has an end portion and a central portion in a predetermined direction. The optical filter suppresses light at a peak wavelength of a light source such that a difference between a sensitivity of optical path via the end portion of the reflecting optical system and the optical filter and a sensitivity of optical path via the central portion of the reflecting optical system and the optical filter fall within a range of 5% at the peak wavelength of light source.

8 Claims, 19 Drawing Sheets

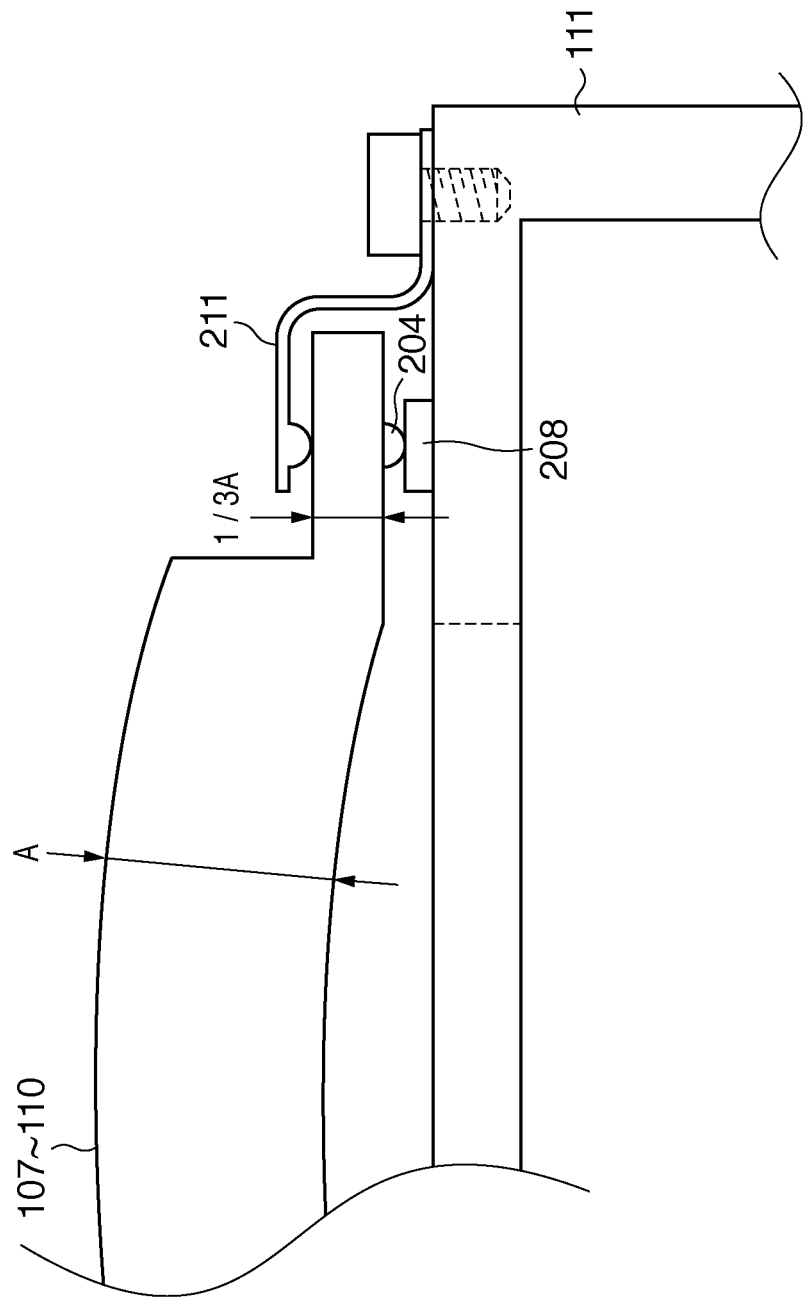

SPECTRAL CHARACTERISTIC OF LIGHT SOURCE (WHITE LED)

COMPARISON OF SPECTRAL REFLECTANCE CHARACTERISTICS OF REFLECTING MIRROR BY IMAGE HEIGHT

|  | BEFORE IMPROVEMENT | | AFTER IMPROVEMENT | |
|---|---|---|---|---|
| PATCH COLOR | AVERAGE LUMINANCE | MAIN-SCANNING LUMINANCE DIFFERENCE | AVERAGE LUMINANCE | MAIN-SCANNING LUMINANCE DIFFERENCE |
| YELLOW | 149 | 22 | 222 | 5 |
| MAGENTA | 58 | 8 | 35 | 3 |
| CYAN | 102 | 9 | 86 | 5 |

FIG. 21

| NAME | COLOR DIFFERENCE ΔE | EXTENT OF COLOR DIFFERENCE |
|---|---|---|
| AVALUATIVE LEVEL | 0.0~0.2 | EVEN A SPECIALLY ADJUSTED COLORIMETER DETECTS ONLY COLOR DIFFERENCES WITHIN THE ERROR RANGE, AND HUMAN CANNOT DISCRIMINATE THEM |
| LIMIT OF DISCRIMINATION | 0.2~0.4 | A SUFFICIENTLY ADJUSTED COLORIMETER DETECTS COLOR DIFFERENCES WITHIN THE RANGE OF REPRODUCIBILITY, AND WELL-TRAINED PEOPLE CAN DISTINGUISH THEM WITH REPRODUCIBILITY |
| GRADE AAA COLOR TOLERANCE | 0.4~0.8 | STRICT COLOR DIFFERENCE STANDARDS CAN BE SET IN VIEW OF REPRODUCIBILITY OF VISUAL DETERMINATION |
| GRADE AA COLOR TOLERANCE | 0.8~1.6 | COLOR DIFFERENCES ARE SENSIBLE FROM SAMPLES PLACED ADJACENTLY, AND A GENERAL COLORIMETER CAN DETECT THEM WITHIN THE ERROR RANGE INCLUDING INSTRUMENTAL ERRORS |
| GRADE A COLOR TOLERANCE | 1.6~3.2 | COLOR DIFFERENCES ARE ALMOST UNNOTICEABLE IN COMPARISON BETWEEN SAMPLES PLACED APART FROM EACH OTHER, AND COLORS ARE USUALLY RECOGNIZED AS SAME |
| GRADE B COLOR TOLERANCE | 3.2~6.5 | IMPRESSION IS THAT COLORS ARE IDENTICAL, BUT COMPLAINTS MAY BE BROUGHT ABOUT COLOR DIFFERENCES IN PAINTS OR THE LIKE |
| GRADE C COLOR TOLERANCE | 6.5~13 | THIS COLOR TOLERANCE CORRESPONDS TO COLOR DIFFERENCE BETWEEN JIS STANDARD COLOR CHIPS OR MUSELL COLOR CHIPS |
| GRADE D COLOR TOLERANCE | 13~25 | COLOR DIFFERENCES ARE BARELY DISCRIMINABLE BY THE SYSTEMATIC COLOR NAME, AND COLORS ARE REGARDED AS DIFFERENT AT HIGHER LEVEL |

| COLOR | SPECTRAL CHANGE RATIO AT PEAK WAVELENGTH | | |
|---|---|---|---|
| | 15% | 10% | 5% |
| GREEN | 3.37 | 3.44 | 1.31 |
| RED | 5.82 | 4.58 | 1.92 |
| BLUE | 6.72 | 5.00 | 2.15 |
| YELLOW | 8.59 | 5.39 | 2.16 |
| MAGENTA | 3.8 | 3.59 | 1.62 |
| CYAN | 6.87 | 4.91 | 1.14 |

IMAGE READING APPARATUS AND IMAGE FORMING APPARATUS

BACKGROUND OF THE INVENTION

1. Field of the Invention

The present invention relates to an image reading apparatus used together with an image forming apparatus and an image reading apparatus used singly.

2. Description of the Related Art

In general, an image reading apparatus mounted on a digital copying machine or the like includes an imaging lens, a line sensor, and a reflecting mirror (Japanese Patent Laid-Open No. 3-113961). The imaging lens and the line sensor are fixed in a housing. On the other hand, the reflecting mirror is mounted on a movable scanning unit to move in the sub-scanning direction with respect to an original. In the image reading apparatus described in Japanese Patent Laid-Open No. 3-113961, the maximum angle of view is generally designed to be almost 20°.

FIG. 23 is a plan view for explaining the angle of view in an image reading apparatus. The vertical direction of FIG. 23 corresponds to the main-scanning direction of the image reading apparatus. The horizontal direction of FIG. 23 corresponds to the sub-scanning direction. The reflection angle of an original image reflected by a reflecting mirror 522 changes between an end portion and the central portion in the main-scanning direction. More specifically, at each end portion in the main-scanning direction, the reflecting mirror 522 reflects light at a predetermined angle θ to condense it onto an imaging lens 525. The angle θ is called an angle of view. The angle of view gradually becomes smaller toward the center in the main-scanning direction. Especially, the angle θ of view is 0° at the center in the main-scanning direction. That is, the angle of view of the original image changes depending on the position where the reflecting mirror 522 reflects the light.

Recently, size reduction of image reading apparatuses has received a great deal of attention. Japanese Patent Laid-Open No. 2004-126448 has proposed an image reading apparatus which reduces the size by employing, as an imaging element, an off axial imaging unit which images via a plurality of mirrors each having an off axial reflecting surface. An off axial reflecting surface is a reflecting surface having a curvature and a reflecting direction different from the reference optical axis line incident direction.

However, an image reading apparatus needs shading correction to correct light amount unevenness independently of its scale. In general, a color image reading apparatus has, on the photoelectric conversion elements of a line sensor, three color filters to pass red (R), green (G), and blue (B) light components, respectively. An RGB line sensor receives the light components that have passed through the three color filters and photoelectrically converts them, thereby obtaining RGB read luminance signals. The illuminance of a light source generally varies. In addition, the light amount around the imaging lens or the imaging mirror decreases. For these reasons, unevenness (shading) occurs in the illuminance on the imaging plane, and shading correction is necessary.

In shading correction, generally, the sensor reads a white reference member immediately before reading an original. Based on the reading result, the gain and offset are adjusted for each pixel.

However, shading correction using the white reference member is possible only for light amount variations which are not related to the spectral characteristic (spectral optical characteristic) of the reading optical system, such as the illuminance unevenness of the light source or the decrease in the light amount around the imaging lens. That is, it is impossible to correct the influence of a change in the spectral characteristic caused by the difference in the angle of view between the reflecting mirror, the imaging mirror, and the imaging lens.

FIG. 24 is a graph showing the spectral characteristics of the reflecting mirror corresponding to different angles of view. The abscissa represents the wavelength, and the ordinate represents the reflectance. As is apparent from FIG. 24, when the angle of view becomes larger, the spectral characteristic shifts toward shorter wavelengths as a whole.

The change in the spectral characteristic depends on the angle of view when an original image becomes incident on the reflecting mirror, the imaging mirror, and the imaging lens. For this reason, the larger the angle of view is, the larger the change in the spectral characteristic is. Note that the spectral characteristic of the entire reading optical system is given as the product of the spectral characteristics of all elements included in the reading optical system. At the time of shading correction, therefore, the change in the spectral characteristic of the whole optical system depending on the angle of view affects the spectral characteristic of the white reference member.

Especially when the light reflected by the original is light of a color (achromatic color such as white, black, or gray) having a spectral characteristic similar to that of white of the white reference member, the effect of shading correction is surely obtained. However, when the light reflected by the original is chromatic color light, the main-scanning read luminance becomes uneven even after shading correction. This is because the shading correction, which is performed based on light of a peak wavelength of white light, cannot completely correct shading of chromatic color light that is different from the peak wavelength. This problem can arise both in reading a chromatic color using an RGB line sensor and in reading a chromatic color using a monochrome line sensor to be described later.

In general, when the difference in the angle of view between an end portion and the central portion in the main-scanning direction is small, the influence of the change in the spectral characteristic of the optical system depending on the angle of view also becomes small. For example, as in the image reading apparatus described in Japanese Patent Laid-Open No. 3-113961, the difference in the angle of view can be made smaller by prolonging the optical path from the reflecting mirror to the CCD sensor. However, since a longer optical path leads to an increase in the size of the image reading apparatus, the object to obtain a compact apparatus cannot be achieved.

In addition to the white reference member, reference members of the respective colors such as red, green, and blue, or cyan, magenta, and yellow having managed densities may be provided, and a shading correction coefficient may be decided for each color. This method also enables to reduce the unevenness in the main-scanning read luminance of a chromatic color.

In this method, however, since the number of reference members that require density management increases, the cost increases inevitably. Additionally, a memory needs to hold shading correction coefficients equal in number to the colors of the reference members. Also required is a circuit for determining a color on an original and selecting a correction coefficient in accordance with the color. This makes the shading correction circuit larger and more complex.

SUMMARY OF THE INVENTION

For example, it is a feature of the present invention to reduce unevenness in the main-scanning read luminance of a chromatic color and degradation in image quality in an image reading apparatus having color sensors and a monochrome sensor.

An image reading apparatus comprises a light source, an imaging unit and a photoelectric conversion unit. The light source irradiates an original with light. The imaging unit images via a reflecting optical system for condensing the reflected light from the original. The photoelectric conversion unit includes a plurality of photoelectric conversion elements arrayed in a predetermined direction and converts, into an electrical signal, the reflected light imaged by the imaging unit. The photoelectric conversion unit includes a plurality of photoelectric conversion elements for monochrome reading. An optical filter is provided on photoelectric conversion elements for monochrome reading. Each of a reflecting optical system and the optical filter has an end portion and a central portion in a predetermined direction. The optical filter suppresses light at a peak wavelength of a light source such that a difference between a sensitivity of optical path via the end portion of the reflecting optical system and the optical filter and a sensitivity of optical path via the central portion of the reflecting optical system and the optical filter fall within a range of 5% at the peak wavelength of light source.

Alternatively, the passing wavelength band of the color separation unit for monochrome reading is designed to generally cut off (i.e., suppress) the light at the peak wavelength of the light source. In addition, the passing wavelength band of the color separation unit for monochrome reading is wider than that of a color separation unit for green.

Further features of the present invention will become apparent from the following description of exemplary embodiments with reference to the attached drawings.

BRIEF DESCRIPTION OF THE DRAWINGS

FIG. 2C is an enlarged sectional view showing part of the imaging mirror and the imaging mirror holding member;

FIG. 21 is a table showing a color difference $\Delta E^*_{ab}$ and the extent regarding human sensation;

DESCRIPTION OF THE EMBODIMENTS

An embodiment of the present invention will now be described. Individual embodiments to be described below will serve to understand various concepts including the superordinate concept, intermediate concept, and subordinate concept of the present invention. The scope of the invention is determined by the appended claims which follow the description and is not limited to the individual embodiments to be described below.

The present invention reduces unevenness in main-scanning read luminance not only when a line sensor for monochrome reading reads a chromatic color but also when an RGB 3-line sensor for color reading reads a chromatic color.

In the following embodiment, an image reading apparatus will be described which employs an image sensor of 4-line sensor type including an RGB 3-line sensor for color reading and a line sensor for monochrome reading. Unevenness in the read luminance of a chromatic color read by the line sensor for monochrome reading will be explained first. Then, the RGB 3-line sensor for color reading will be explained.

An RGB three-line sensor includes an R (red) line sensor, a G (green) line sensor, and a B (blue) line sensor. They have R, G, and B filters having different passing wavelength bands. These optical filters are commonly called color filters and function as color separation units. Note that a passing wavelength band (passband) is defined by a cutoff wavelength and a bandwidth. These color filters color-separate reflected and scattered light imaged by an imaging unit. Each color-separated reflected and scattered light is converted into an electrical signal representing luminance by a corresponding line sensor (photoelectric conversion unit).

In general, no color filter is attached to the fourth line sensor, that is, the monochrome line sensor. In this embodiment, however, a broadband G filter to be described later is provided. The color filter for the monochrome line sensor is designed to have a band wider than that of a normal G filter.

Figure 1A:
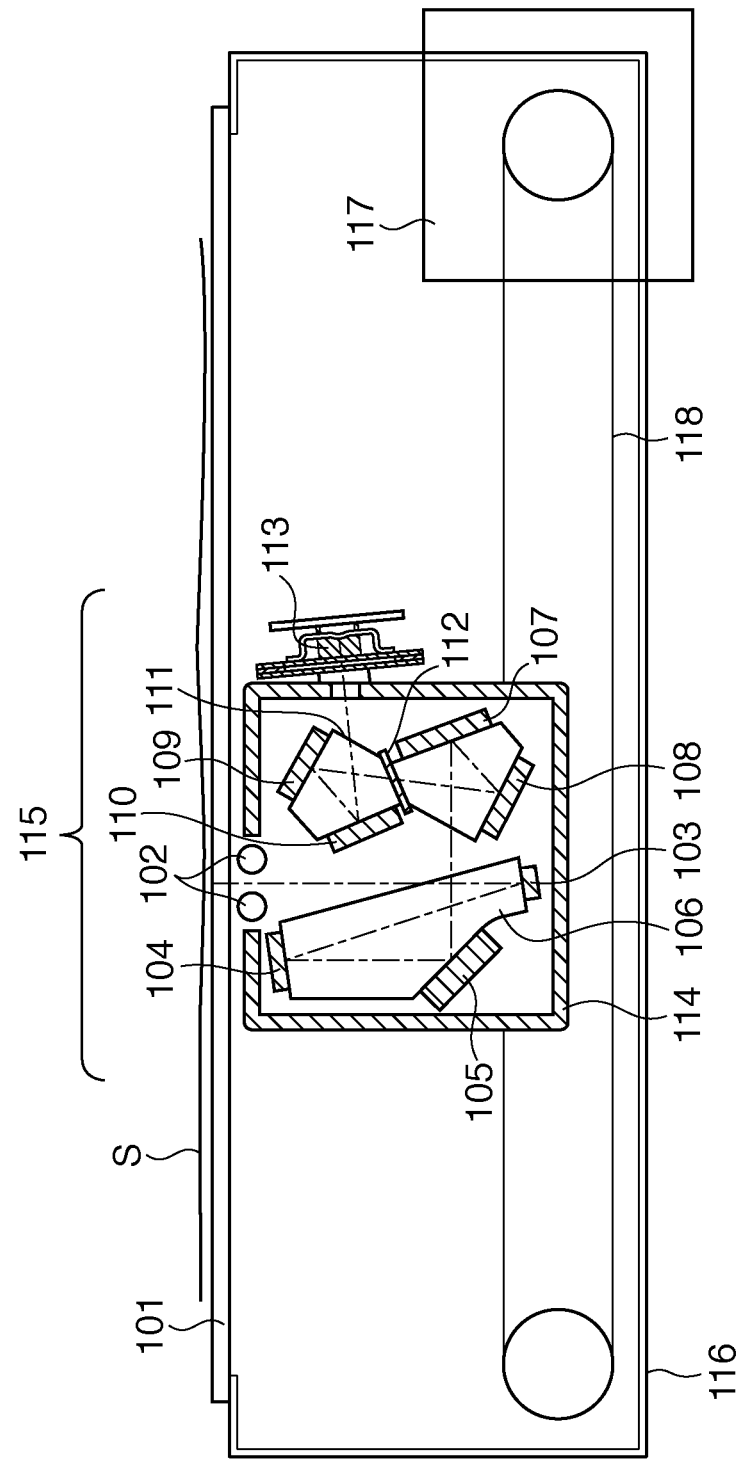
FIG. 1A is a sectional view showing an example of an image reading apparatus according to an embodiment.
Figure 1B:
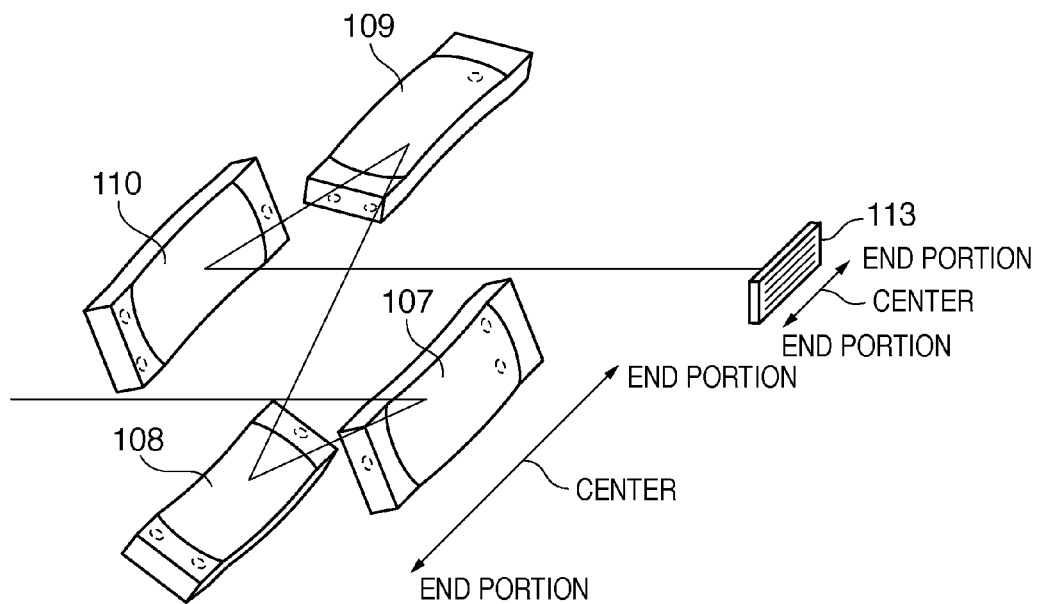
FIG. 1B is a perspective view showing the positional relationship between imaging mirrors 107, 108, 109, and 110 and a CCD line sensor 113.

FIG. 1A is a sectional view showing an example of the image reading apparatus according to the embodiment. An original is placed on an original platen glass 101. A light source 102 is a white LED array or a tube light source to irradiate the original with light. Plane mirrors 103, 104, and 105 serve as reflecting mirrors to guide the light diffused by the original. The plane mirrors 103, 104, and 105 form a reflecting optical system. The reflecting optical system may be formed from a plurality of optical components, as described above, or a single optical component. A plane mirror holding member 106 holds the plane mirrors 103, 104, and 105. Each of imaging mirrors 107, 108, 109, and 110 has an off axial reflecting surface. FIG. 1B is a perspective view showing the positional relationship between the imaging mirrors 107, 108, 109, and 110 and a CCD line sensor 113. An imaging mirror holding member 111 holds the imaging mirrors 107, 108, 109, and 110. The imaging mirrors 107, 108, 109, and 110 form both a reflecting optical system and an imaging optical system. A stop 112 is provided in the imaging mirror holding member 111 to restrict light from the imaging mirror 108. The CCD line sensor 113 is a 4-line sensor, as described above. The CCD line sensor 113 is an example of a photoelectric conversion unit which photoelectrically converts reflected and scattered light imaged by an imaging unit. CCD is short for Charge Coupled Device. Note that a sensor of another scheme such as a CMOS image sensor may be adopted in place of the CCD. A scanning frame 114 holds the light source 102, the plane mirrors 103, 104, and 105, the imaging mirror holding member 111, and the CCD line sensor 113. The imaging mirrors 107, 108, 109, and 110 and the imaging mirror holding member 111 form an off axial imaging unit 115. Note that these reflecting mirrors and imaging mirrors form an example of an imaging unit which condenses the reflected and scattered light from the original and images via the plurality of plane mirrors and imaging mirrors.

A reading unit frame 116 supports the original platen glass 101. The scanning frame 114 is arranged in the reading unit frame 116. The scanning frame 114 is driven by a driving motor 117 and a driving belt 118 so as to reciprocally move in the sub-scanning direction in the reading unit frame 116. The scanning frame 114 is an example of a moving unit on which the light source, the imaging unit, and the photoelectric conversion unit are mounted and which moves in the sub-scanning direction perpendicular to the main-scanning direction.

An operation of reading an original S placed on the original platen glass 101 will be described. The light source 102 lights up so that light from it illuminates the original S. The driving motor 117 and the driving belt 118 move the scanning frame 114 in the sub-scanning direction to scan the original S. The light emitted from the light source 102 to irradiate the original S is diffused on it. The plane mirrors 103, 104, and 105 guide the diffused light to the off axial imaging unit 115.

The imaging mirrors 107 to 110 sequentially reflect the light guided to the off axial imaging unit 115. Finally, the light is imaged on the CCD line sensor 113 by the functions of the diffused light and the off axial reflecting surfaces formed on the imaging mirrors. The CCD line sensor 113 photoelectrically converts the received light to generate an electrical signal representing the original image.

Figure 2A:
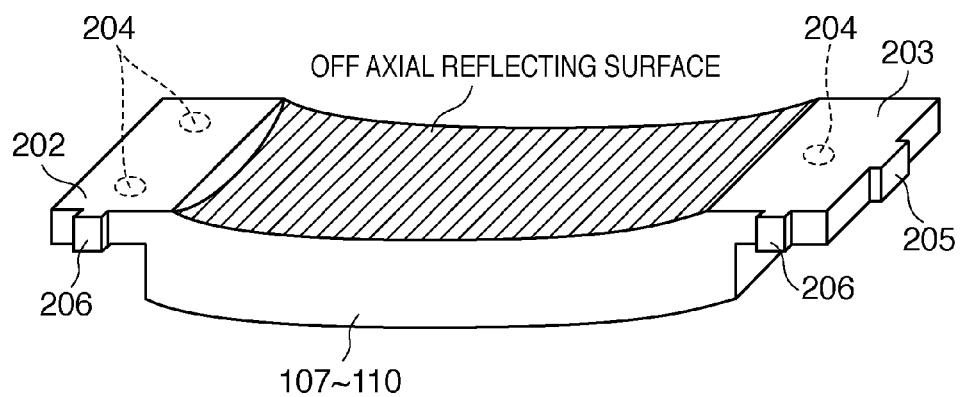
FIG. 2A is an enlarged view of an imaging mirror.

FIG. 2A is an enlarged view of an imaging mirror. Each of the imaging mirrors 107, 108, 109, and 110 has an off axial reflecting surface at the hatched portion in FIG. 2A. Fixing parts 202 and 203 locate and fix the imaging mirror. Hemisphere faces 204 are convex members which locate the imaging mirror in the Z direction. The hemisphere faces 204 are formed at three points. A striking part 205 locates the imaging mirror in the X direction. Striking parts 206 locate the imaging mirror in the Y direction. All the hemisphere faces 204 and the striking parts 205 and 206 to locate the imaging mirror in the X, Y, and Z directions are provided on the fixing parts 202 and 203. The fixing parts 202 and 203 are thinner than the portion where the off axial reflecting surface is formed and therefore have a smaller second moment of area.

Figure 2B:
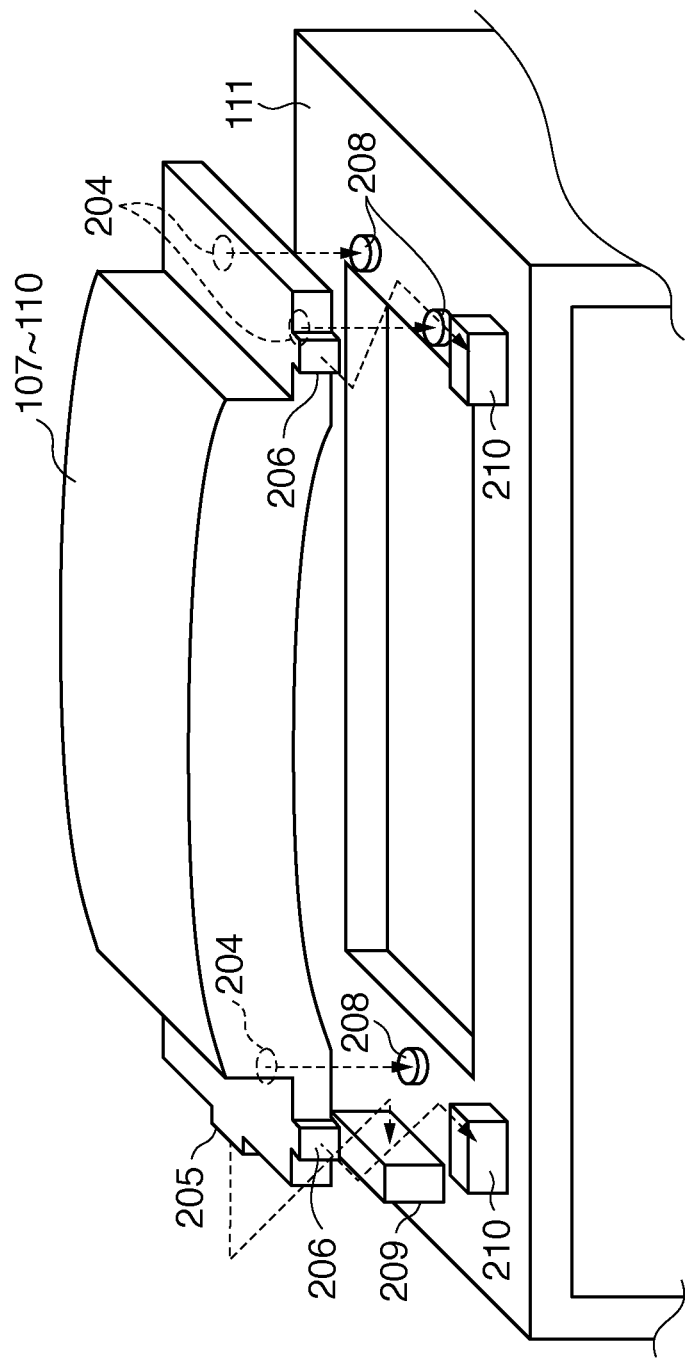
FIG. 2B is a perspective view showing the imaging mirror and part of an imaging mirror holding member.

FIG. 2B is a perspective view showing the imaging mirror and part of the imaging mirror holding member. The imaging mirror holding member 111 has projecting parts 208 and reception parts 209 and 210. Three projecting parts 208 are provided to hold the three hemisphere faces 204 formed on each of the imaging mirrors 107, 108, 109, and 110. The imaging mirror is thus located in the Z direction. The reception part 209 holds the striking part 205. The reception parts 210 hold the striking parts 206. The imaging mirror is thus located in the X and Y directions.

FIG. 2C is an enlarged sectional view showing part of the imaging mirror and the imaging mirror holding member. Press members 211 are attached to the imaging mirror holding member 111 to fix the imaging mirror. The press members 211 are provided in correspondence with the three hemisphere faces 204, respectively. The three press members 211 press the imaging mirror by equal forces.

Note that the forces of the press members 211 acting on the fixing parts 202 and 203 of the imaging mirror generate stress in it. The stress is going to deform the imaging mirrors 107, 108, 109, and 110. In addition, a moment is generated if the pressurization points between the hemisphere faces 204 and the press members 211 shift due to attachment errors of the press members 211 or molding errors of the imaging mirrors 107, 108, 109, and 110. The moment is also going to deform the imaging mirrors 107, 108, 109, and 110. However, the fixing parts 202 and 203 deform and absorb the internal stress and moment because their second moment of area is smaller than that of the portion with the off axial reflecting surface. Hence, the deformation of the off axial reflecting surface is very small.

When heat generated by the light source 102, the CCD line sensor 113, and the driving motor 117 is transferred to the imaging mirror via air in the image reading apparatus, the imaging mirror thermally expands. Since the imaging mirror and the imaging mirror holding member 111 have different coefficients of linear expansion, stress to deform the imaging mirror is generated. However, the fixing parts 202 and 203 absorb such internal stress and moment as well. Hence, the deformation of the off axial reflecting surface can be very small.

If the fixing parts 202 and 203 deform, the position of the off axial reflecting surface changes. However, the influence of the position change of the off axial reflecting surface on the optical performance is about 1/10 that of deformation of the off axial reflecting surface itself. Additionally, the position change caused by the deformation of the fixing parts 202 and 203 is very small. Hence, the degradation of optical performance caused by the fixing method of this embodiment is very small at negligible level for practical use.

Figure 3:
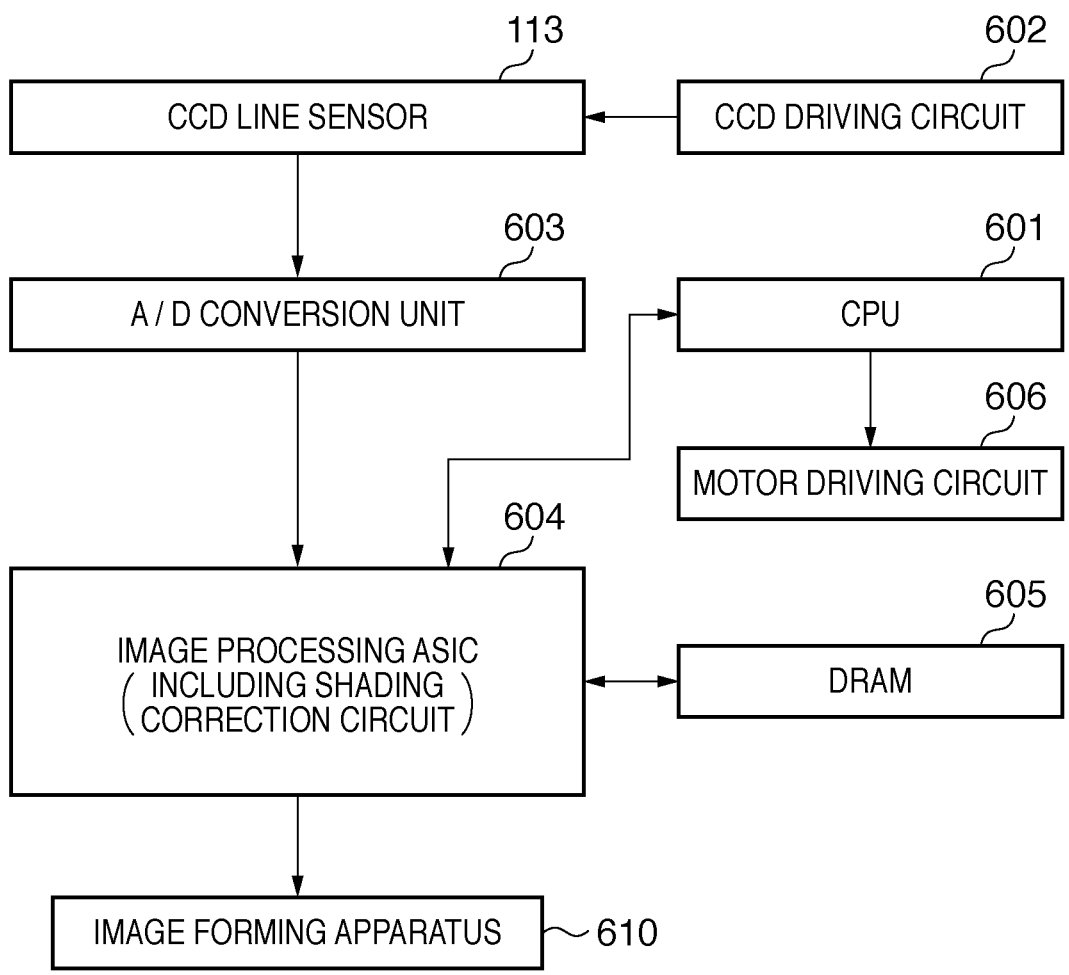
FIG. 3 is a block diagram showing a control unit arranged in the image reading apparatus according to the embodiment.

FIG. 3 is a block diagram showing a control unit arranged in the image reading apparatus according to the embodiment. A CPU 601 is a unit which comprehensively controls the units of the image reading apparatus. A CCD driving circuit 602 drives and controls the CCD line sensor 113. An A/D conversion unit 603 converts analog data output from the CCD line sensor 113 into digital data. An image processing ASIC 604 performs image processing for the signal output from the A/D conversion unit 603. Examples of the image processing are shading correction, color misregistration correction, and MTF (Modulation Transfer Function) correction. The image processing ASIC 604 is an example of a shading correction unit which performs shading correction using an electrical signal generated by causing the photoelectric conversion unit to convert light received from a white reference member via the imaging unit. A DRAM 605 is a storage device which temporarily stores image data. Image data processed by the image processing ASIC 604 is sent to an image forming apparatus (not shown). A motor driving circuit 606 controls the driving motor 117 in accordance with an instruction from the CPU 601. An image forming apparatus 610 forms an image on a paper sheet based on image data output from the image reading apparatus. The image forming apparatus 610 may serve as the image forming unit of a copying machine. The image forming apparatus 610 is an example of an image forming unit which receives an electrical signal representing an original image from the image reading apparatus and forms an image. The image forming unit can employ any scheme such as electrophotography or inkjet.

[Shading Correction]

Shading correction using a white reference member will be described next. The shading correction corrects reading variations between the pixels of image data output from the CCD line sensor 113.

First, light from the light source 102 irradiates the white reference member. The CCD line sensor 113 reads the diffused light from the white reference member. Note that the white reference member has a managed density. Using the white reference member reading result, the image processing ASIC 604 acquires shading data based on unevenness in the illuminance of the light source 102, the decrease in the light amount at the periphery of the imaging mirrors 107 to 110, and variations in the pixel sensitivity of the CCD line sensor 113.

The image processing ASIC 604 adjusts the gain value for each pixel such that each pixel value of the shading data equals an arbitrary target value (e.g., 245 in luminance value). The image processing ASIC 604 stores the adjustment values in the DRAM 605 as gain adjustment values.

Next, the image processing ASIC 604 acquires shading data in the OFF state of the light source 102. The image processing ASIC 604 adjusts the offset for each pixel such that each pixel value (black offset value) of data output from the CCD line sensor 113 equals an arbitrary target value (e.g., 5 in luminance value). The image processing ASIC 604 stores the adjustment values in the DRAM 605 as offset adjustment values.

The image processing ASIC 604 performs gain adjustment and offset adjustment for each pixel of the image data output from the CCD line sensor 113 based on the gain adjustment values and the offset adjustment values. With the above processing, the shading correction using the white reference member ends.

The shading correction using the white reference member reduces the unevenness in the illuminance of the light source 102, the decrease in the light amount at the periphery of the imaging mirrors 107 to 110, and variations in the pixel sensitivity of the CCD line sensor 113. That is, reading in a uniform state is supposed to be possible in the main-scanning direction.

[Relationship between Angle of View and Spectral Characteristic]

Reflected and scattered light from an original which is irradiated with light from the light source 102 is affected by a change in the spectral characteristic according to the angle of view while being sequentially reflected by the plane mirrors 103 to 105 and the imaging mirrors 107 to 110.

However, the maximum angles of view of the respective mirrors do not always match. This is because the original image reflection position (i.e., maximum angle of view) in the main-scanning direction sometimes changes between the mirrors.

Instead of individually showing the maximum angles of view of the respective mirrors, a spectral characteristic after the plane mirrors 103 to 105 have sequentially reflected light will be described below as the spectral characteristic of a reflecting mirror. Similarly, a spectral characteristic after the imaging mirrors 107 to 110 have sequentially reflected light will be described below as the spectral characteristic of an imaging mirror. A change in the spectral characteristic will be expressed below not as a change in the spectral characteristic depending on the angle of view on each mirror but as a change in the spectral characteristic depending on the main-scanning original image reading position (i.e., image height).

The relationship between the image height and the angle of view will be explained here. That the image height is high indicates that the position is far apart from the optical axis center, that is, the angle of view is large. Conversely, that the image height is low indicates that the position is close to the optical axis center, that is, the angle of view is small.

Examples of the characteristics of the elements of the reading optical system employed in this embodiment will be described next.

Figure 4A:
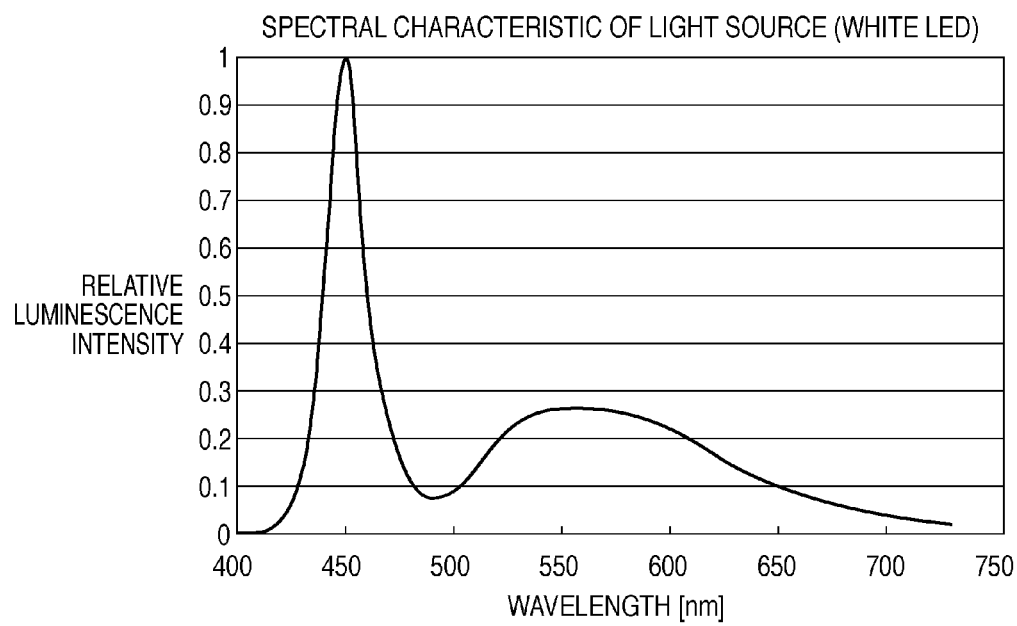
FIG. 4A is a graph showing an example of the spectral characteristic of a white LED serving as a light source 102.
Figure 4B:
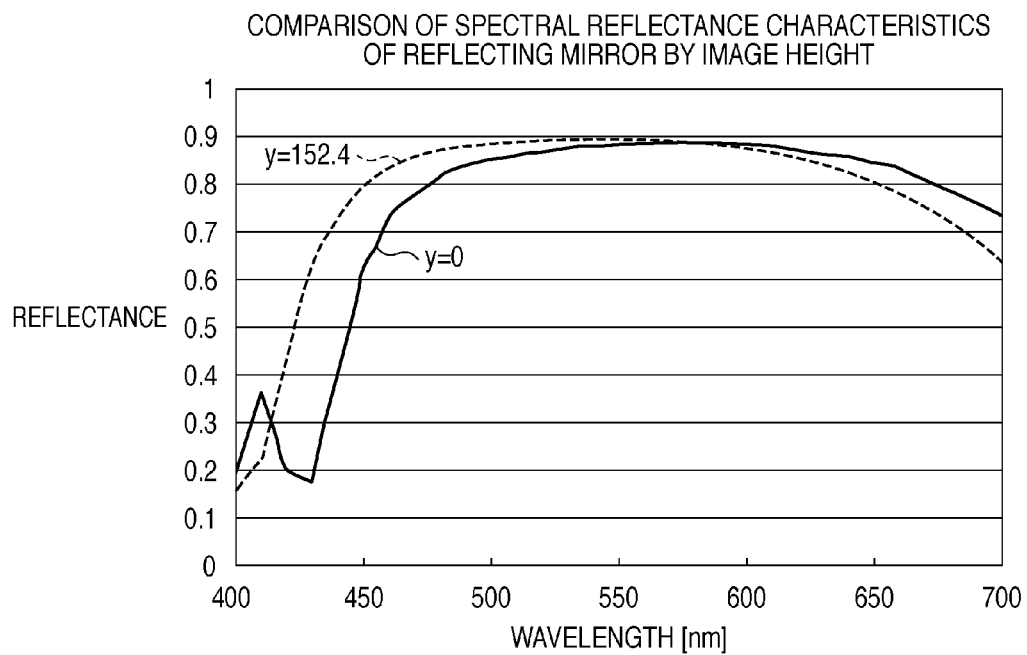
FIG. 4B is a graph showing an example of the spectral characteristic of a reflecting mirror serving as plane mirrors 103 to 105.
Figure 4C:
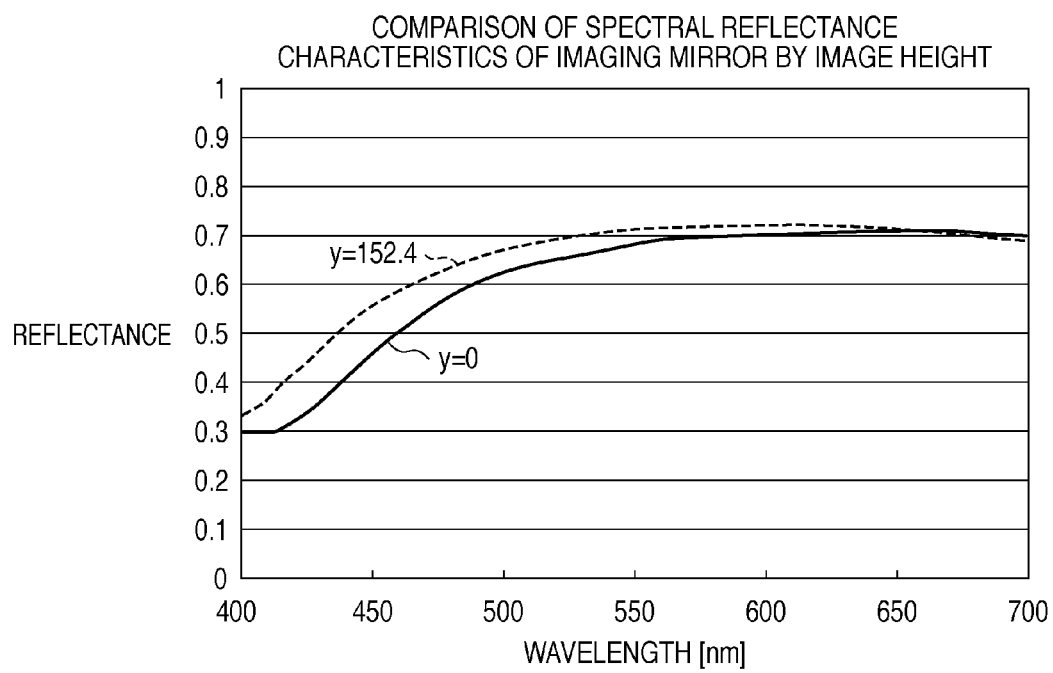
FIG. 4C is a graph showing an example of the spectral characteristic of imaging mirrors 107 to 110.

FIG. 4A is a graph showing an example of the spectral characteristic of a white LED serving as the light source 102. The abscissa represents the wavelength, and the ordinate represents the relative luminescence intensity. Note that the luminescence intensity of the light source corresponding to each wavelength will be referred to as a relative spectral distribution characteristic. FIG. 4B is a graph showing an example of the spectral characteristic of a reflecting mirror serving as the plane mirrors 103 to 105. FIG. 4C is a graph showing an example of the spectral characteristic of the imaging mirrors 107 to 110. The abscissa represents the wavelength, and the ordinate represents the reflectance. Note that the reflectance of an optical component corresponding to each wavelength will be referred to as a spectral reflectance characteristic.

Generally, a reflecting mirror and an imaging mirror are manufactured by vapor-depositing aluminum (Al) on glass and a resin, respectively. This aims at raising the reflectance by overcoating a metal thin film with a dielectric substance. The present inventor formed the mirrors shown in FIGS. 4B and 4C by optimization using simulations while setting the center wavelength of design at 600 nm to obtain a desired characteristic.

In this embodiment, a wide-angle imaging optical system is employed. For this reason, the change in the spectral characteristic depending on the image height (angle of view) is larger in this embodiment than in a reduction optical system which scans an original surface using a scanning unit with a fixed light source and reflecting mirrors, as described in Japanese Patent Laid-Open No. 3-113961.

"Wide-angle" indicates that the angle of view of each mirror is large in the process of imaging on the CCD line sensor 113. This corresponds to a general wide-angle lens having a focal length of 500 mm or less in a 35-mm converted value. In this embodiment, an image is formed using not lenses but mirrors. However, the definition of the focal length is the same as that for the wide-angle lens.

In FIGS. 4B and 4C, the image height is represented by y. Image height y=0 corresponds to the center in the main-scanning direction (the position where the angle of view is minimized at 0°). Image height y=152.4 corresponds to an end portion in the main-scanning direction (the position where the angle of view is maximized). FIGS. 4B and 4C illustrate the difference in the spectral characteristic between the image heights.

The spectral characteristic of the entire reading optical system including the sensitivities of the white LED serving as the light source 102, the plane mirrors 103 to 105, the imaging mirrors 107 to 110, and the CCD line sensor 113 before normalization based on the peak wavelength is compared with that after normalization.

Figure 5A:
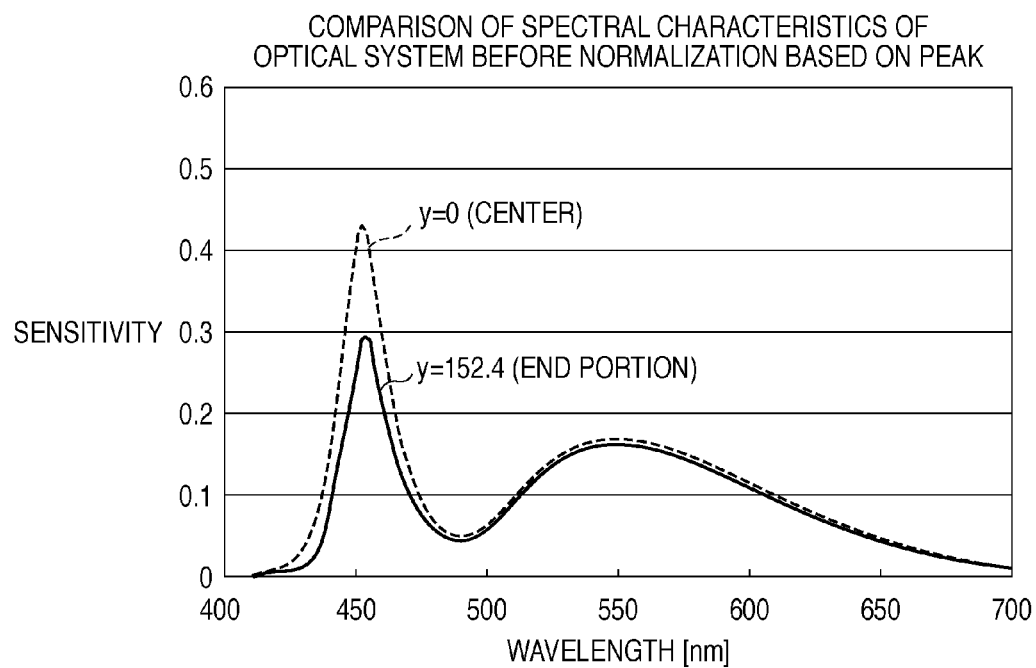
FIG. 5A is a graph showing the spectral characteristic of an entire reading optical system before normalization based on the peak wavelength.
Figure 5B:
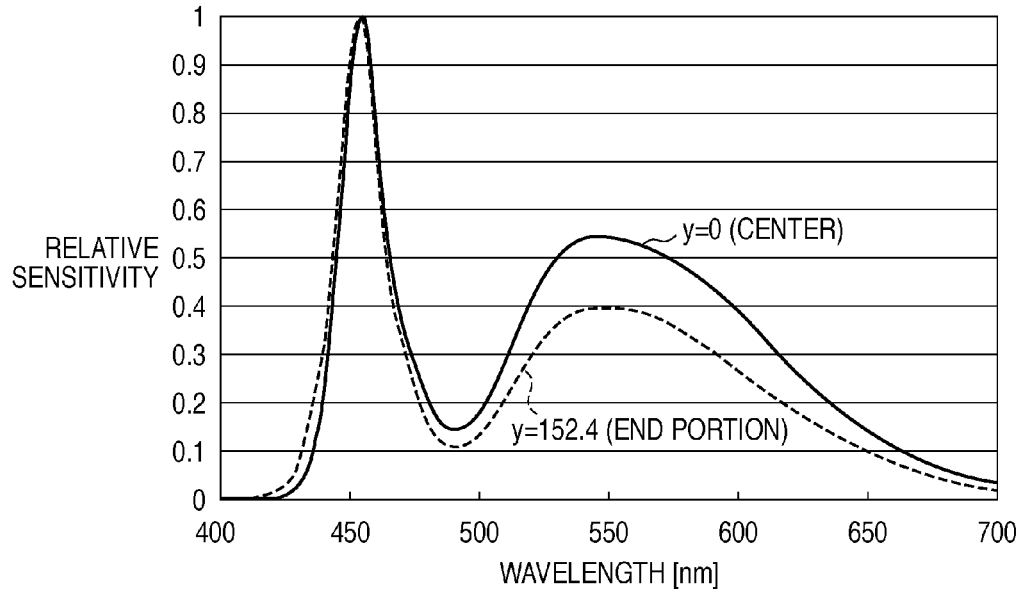
FIG. 5B is a graph showing the spectral characteristic of the entire reading optical system after normalization based on the peak wavelength.

FIG. 5A is a graph showing the spectral characteristic of the entire reading optical system before normalization based on the peak wavelength. FIG. 5B is a graph showing the spectral characteristic of the entire reading optical system after normalization based on the peak wavelength. The abscissa represents the wavelength, and the ordinate represents the sensitivity (the ratio of output to input). Note that the sensitivity of a light-receiving element or an optical component corresponding to each wavelength will be referred to as a spectral sensitivity characteristic. In FIGS. 5A and 5B, the sensitivity by which the reading optical system can read at image height y=0 is compared with that at y=152.4 at each wavelength.

As is apparent from FIG. 5A, the sensitivity near the peak wavelength of 450 nm largely changes in accordance with the image height. This is because the changes in the spectral characteristics of the reflecting mirror and the imaging mirror depending on the image height shown in FIGS. 4B and 4C affect the peak wavelength of 450 nm of the white LED in FIG. 4A.

First, place focus on 450 nm concerning the change in the spectral reflectance of the reflecting mirror depending on the image height shown in FIG. 4B. The reflectances are about 63% at image height y=0 and 80% at image height y=152.4. Hence, the reflectance difference by the image height is 17%.

Next, place focus on 450 nm concerning the change in the spectral reflectance of the imaging mirror depending on the image height shown in FIG. 4C. The reflectances are about 46% at image height y=0 and 56% at image height y=152.4. Hence, the reflectance difference by the image height is 10%.

As for the entire reading optical system, focus is placed on 450 nm in FIG. 5A. The sensitivities are about 29% at image height y=0 and 42% at image height y=152.4. Hence, the sensitivity changes by 13% as the image height changes.

To check the influence of a change in the sensitivity at the peak wavelength on the entire spectral characteristic, the spectral characteristic normalized based on the peak wavelength (FIG. 5B) will be examined next.

Referring to FIG. 5B, the sensitivity at each wavelength is normalized based on the sensitivity near the peak wavelength of 450 nm. As is apparent from FIG. 5B, the change in the sensitivity at the peak wavelength largely affects the spectral characteristic on the side of wavelengths longer than 500 nm. Especially place focus on 550 nm where the change is large. The sensitivities are about 54% at image height y=0 and 39% at image height y=152.4. Hence, the sensitivity difference by the image height is 15%.

In the examples of the spectral characteristics of the reflecting mirror and the imaging mirror employed in this embodiment, the changes in the spectral characteristics of the reflecting mirror and the imaging mirror depending on the image height largely affect reading of colors on the side of wavelengths longer than 500 nm.

[Unevenness in Main-Scanning Read Luminance]

Figure 6:
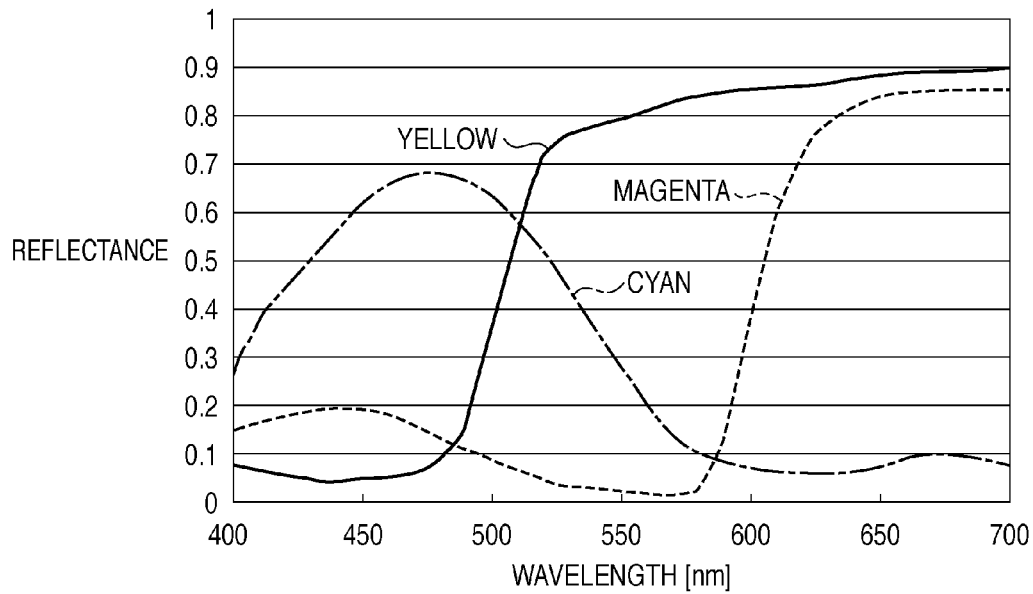
FIG. 6 is a graph showing the spectral sensitivity characteristics of yellow, magenta, and cyan that are primary colors.

FIG. 6 is a graph showing the spectral sensitivity characteristics of yellow, magenta, and cyan that are primary colors. Especially, yellow is a color having a more prominent spectral sensitivity characteristic on the side of wavelengths longer than 500 nm.

Figure 7:
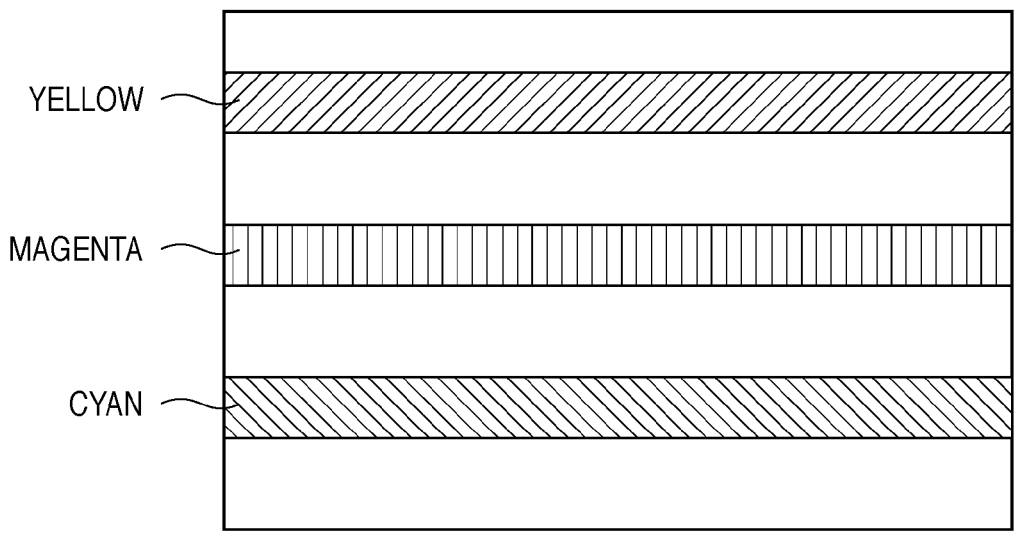
FIG. 7 is a view showing an example of a chart in which yellow patches are distributed at a uniform density in the main-scanning direction.

FIG. 7 is a view showing an example of a chart in which yellow patches are distributed at a uniform density in the main-scanning direction. The chart shown in FIG. 7 also illustrates magenta and cyan patches other than yellow. This chart is used to compare the degree of influence of the change in the spectral characteristic of the reading optical system on the difference in the spectral characteristic between colors.

Figure 8:
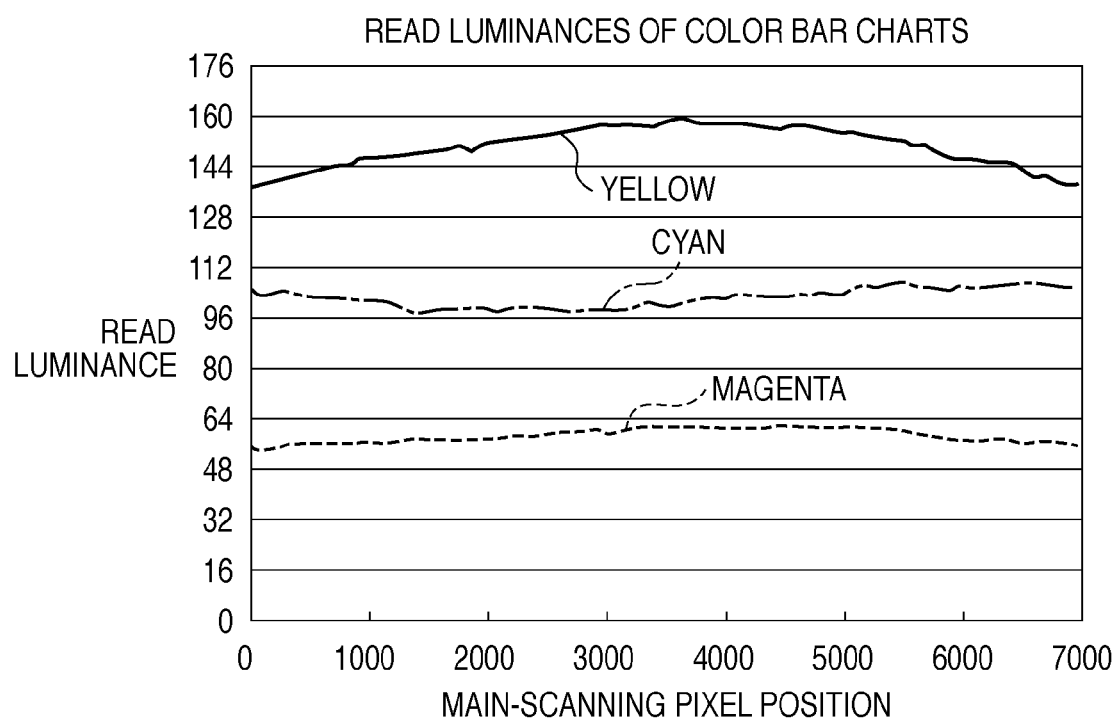
FIG. 8 is a graph showing the read luminances of the respective colors obtained by causing the reading optical system having the spectral characteristic shown in FIGS. 5A and 5B to read the chart shown in FIG. 7.

FIG. 8 is a graph showing the read luminances of the respective colors obtained by causing the reading optical system having the spectral characteristic shown in FIGS. 5A and 5B to read the chart shown in FIG. 7. The abscissa represents the pixel position in the main-scanning direction, and the ordinate represents the read luminance.

Referring to FIG. 8, pixel position "0" in the main-scanning direction corresponds to the position of image height y=152.4. This position is an end portion in the main-scanning direction where the angle of view is maximized. In addition, pixel position "3500" corresponds to the position of image height y=0. This position is the central portion in the main-scanning direction where the angle of view is minimized. Furthermore, pixel position "7000" corresponds to the position of image height y=−152.4. This position is also an end portion in the main-scanning direction where the angle of view is maximized.

Both the reflecting mirror and the imaging mirror have a symmetrical surface with respect to image height y=0. Hence, the larger the absolute value of the image height becomes from image height y=0, the larger the angle of view becomes.

Referring to FIG. 8, the read luminance of yellow is 152 at an end portion (pixel position "0" or "7000" in the main-scanning direction). The luminance is 175 at the central portion (pixel position "3500" in the main-scanning direction). The read luminance difference between the end portion and the central portion in the main-scanning direction is 23 in level. As for cyan and magenta, the read luminance differences between the end portion and the central portion in the main-scanning direction are 16 and 11 in level, respectively.

As described above, in the reading optical system having an imaging optical system with a large angle of view, the main-scanning read luminance changes even after shading correction using the white reference member. This phenomenon will be called "unevenness in the main-scanning read luminance".

[Shading Correction for Chromatic Color]

Shading correction using a white reference member is correction processing generally performed in the image reading apparatus to correct unevenness in the illuminance of the light source, variations in the output from the line sensor, and the decrease in the light amount at the periphery of the imaging mirrors. However, the shading correction using the white reference member cannot completely correct unevenness in the main-scanning read luminance of a chromatic color. The reason for this will be described below.

Figure 9:
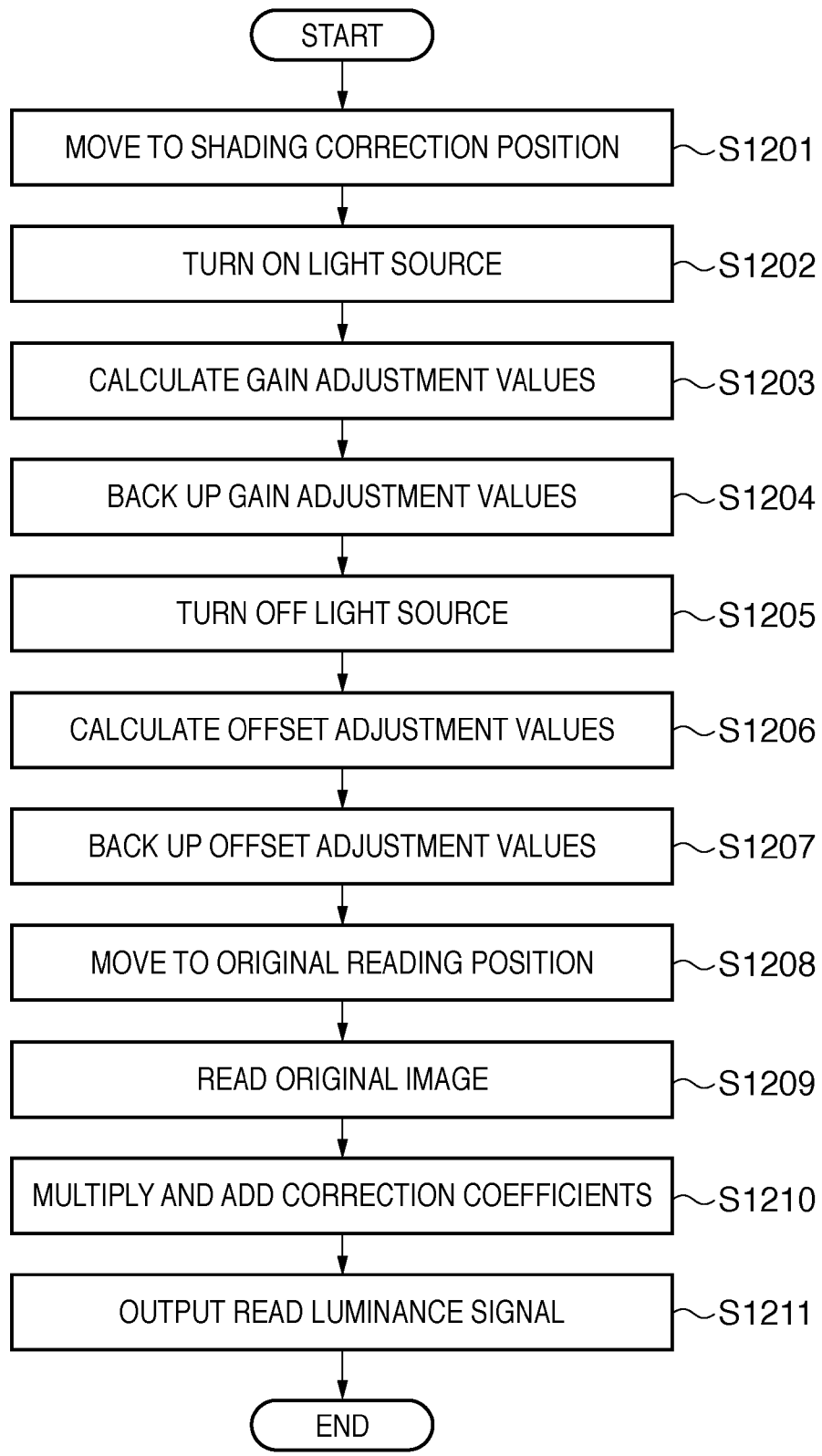
FIG. 9 is a flowchart illustrating an example of shading correction.

FIG. 9 is a flowchart illustrating an example of shading correction. In step S1201, the CPU 601 instructs the motor driving circuit 606 to move the scanning frame 114 to a position immediately under the white reference member bonded onto the original platen glass 101. The motor driving circuit 606 drives the driving motor 117 in accordance with the instruction.

In step S1202, the CPU 601 turns on the light source 102 and controls the CCD driving circuit 602 to cause the CCD line sensor 113 to acquire shading data.

In step S1203, the CPU 601 instructs the image processing ASIC 604 to decide the gain values. The image processing ASIC 604 adjusts the gain adjustment value for each pixel such that each pixel value of the shading data equals a target value.

In step S1204, the image processing ASIC 604 stores the gain adjustment values of the respective pixels in the DRAM 605.

In step S1205, the CPU 601 turns off the light source 102 to create a dark state. The CCD driving circuit 602 operates the CCD line sensor 113 to acquire data.

In step S1206, the image processing ASIC 604 calculates the reading level of the CCD line sensor 113 in the dark state as the black level offset adjustment value.

In step S1207, the image processing ASIC 604 stores the gain adjustment values of the respective pixels in the DRAM 605.

In step S1208, the CPU 601 instructs the motor driving circuit 606 to move the scanning frame 114 to the position of the original S on the original platen glass 101. The motor driving circuit 606 drives the driving motor 117 in accordance with the instruction.

In step S1209, the CPU 601 turns on the light source 102 in the scanning frame 114 moved to the position of the original S and starts reading the original image. The scanning frame 114 moves in the sub-scanning direction at a predetermined speed. The CCD line sensor 113 photoelectrically converts the image data of the original formed by causing the plane mirrors 103 to 105 and the imaging mirrors 107 to 110 to sequentially reflect the light. An electrical signal representing the original image is thus obtained. The A/D conversion unit 603 converts the analog electrical signal into digital image data.

In step S1210, the image processing ASIC 604 multiplies each pixel value of the image data by a corresponding gain adjustment value and adds a corresponding offset adjustment value to each obtained product.

In step S1211, the image processing ASIC 604 outputs the image data that has undergone the shading correction to the succeeding image processing stage as a read luminance signal.

In the series of shading correction processes, gain adjustment values corresponding to the pixels are calculated in step S1203. The gain adjustment values are calculated in consideration of the influence of the changes in the spectral characteristics of the plane mirrors 103 to 105 and the imaging mirrors 107 to 110 depending on the image height in addition to unevenness in the illuminance of the light source 102 and variations in the sensitivity of the CCD line sensor 113 between the pixels.

The changes in the spectral characteristics of the plane mirrors 103 to 105 and the imaging mirrors 107 to 110 depending on the image height affect the spectral characteristic of the entire reading optical system by the image height as well. Hence, the change in the spectral characteristic of the reading optical system depending on the image height affects the read luminance in association with the spectral characteristic of each color on the original of the reading target.

The read luminance is given by the integration of the spectral characteristic of the reading optical system and that of each color on the original of the reading target. Even when the spectral characteristic of a color is constant in the main-scanning direction, the spectral characteristic of the optical system changes by the image height, and the read luminance also changes by the image height.

Hence, if the white reference member has a managed uniform density, the unevenness in the illuminance of the light source 102 and the variations in the sensitivity of the CCD line sensor 113 are small at negligible level, and the spectral characteristics of the plane mirrors 103 to 105 and the imaging mirrors 107 to 110 do not change by the image height, the pixels use almost the same gain adjustment value.

However, as described above, the spectral characteristics of the plane mirrors 103 to 105 and the imaging mirrors 107 to 110 change by the image height. Hence, the gain adjustment value changes between the pixels even if the influences of the unevenness in the illuminance of the light source 102 and the variations in the sensitivity of the CCD line sensor 113 are small at negligible level.

Figure 10:
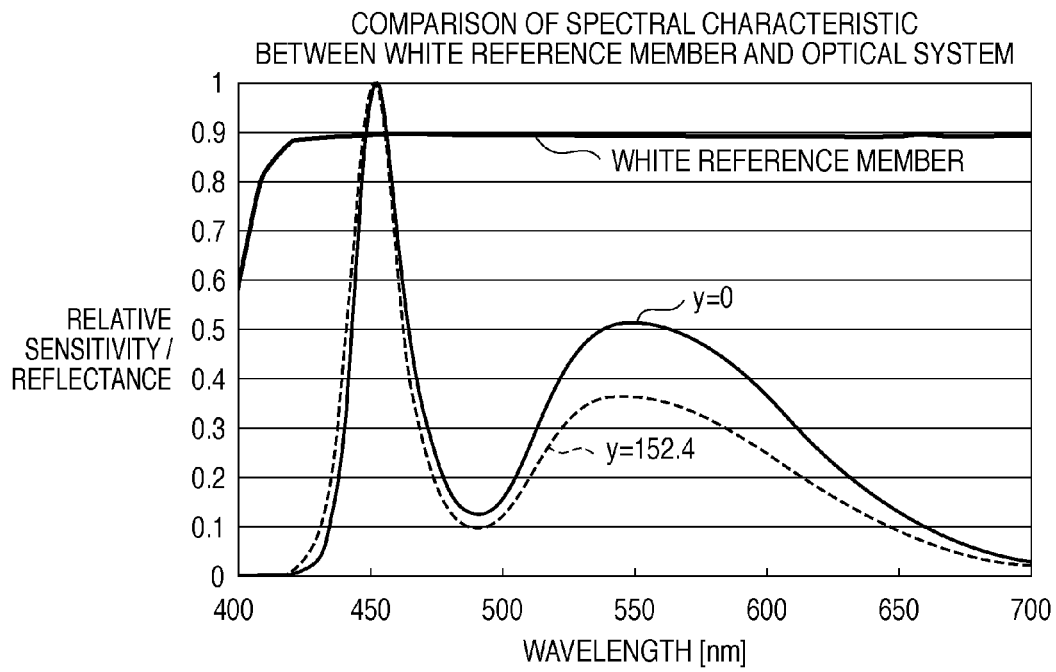
FIG. 10 is a graph showing the spectral characteristic of a white reference member and the spectral characteristic of an optical system normalized based on the peak wavelength.

FIG. 10 is a graph showing the spectral characteristic of the white reference member and the spectral characteristic of the optical system normalized based on the peak wavelength. The abscissa represents the wavelength, and the ordinate represents the relative sensitivity (reflectance). FIG. 10 shows the spectral characteristic of the optical system at image height y=0 and that at image height y=152.4.

Referring to FIG. 10, the spectral characteristic of the white reference member is almost constant at a reflectance of 0.9 over the wavelengths. Integrated values associated with the spectral characteristics of the white reference member and the optical system are as follows.

The integrated value is 75.7 at image height y=0 (center).

The integrated value is 59.9 at image height y=152.4 (end portion).

The two integrated values have a large difference.

Setting the target value of shading correction to read luminance "255", a gain adjustment value G is calculated for each of the integrated values.

$G_0$=3.38 at image height y=0

$G_{152.4}$=4.26 at image height y=152.4 where $G_0$ and $G_{152.4}$ are gain adjustment values at image height y=0 and image height y=152.4. The image processing ASIC 604 uses these values as the correction values at the positions of image height y=0 and image height y=152.4 at the time of shading correction.

That is, the change in the spectral characteristic of the optical system depending on the image height affects the gain adjustment values in shading correction as well.

The actual gain adjustment values in shading correction are affected not only by the change in the spectral characteristic of the optical system depending on the image height but also by the unevenness in the illuminance of the light source. However, the spectral characteristic of the light source 102 used in the image reading apparatus is managed within a predetermined specifications range. Hence, the change in the spectral characteristic caused by unevenness in the illuminance is very small. A change in the illuminance in the main-scanning direction occurs as unevenness in the illuminance of the light source 102.

However, if the spectral characteristic of the light source 102 does not change in the main-scanning direction, unevenness in the main-scanning read luminance by unevenness in the illuminance of the light source 102 appears in any color. More specifically, unevenness in the luminance appears not only in white of the white reference member but also in other general achromatic and chromatic colors. That is, unevenness in the main-scanning read luminance appears not only in chromatic colors.

Hence, as for unevenness in the illuminance of the light source 102, shading correction using the white reference member enables uniform reading in the main-scanning direction. On this point, unevenness in the illuminance is substantially different from unevenness in the main-scanning read luminance caused by the change in the spectral characteristic of the reading optical system depending on the image height.

Note that the change in the spectral characteristic of the reading optical system depending on the image height does not reduce the effect of shading correction using the white reference member for all colors. More specifically, the shading correction effect can be obtained for achromatic colors such as white, black, and gray.

Figure 11:
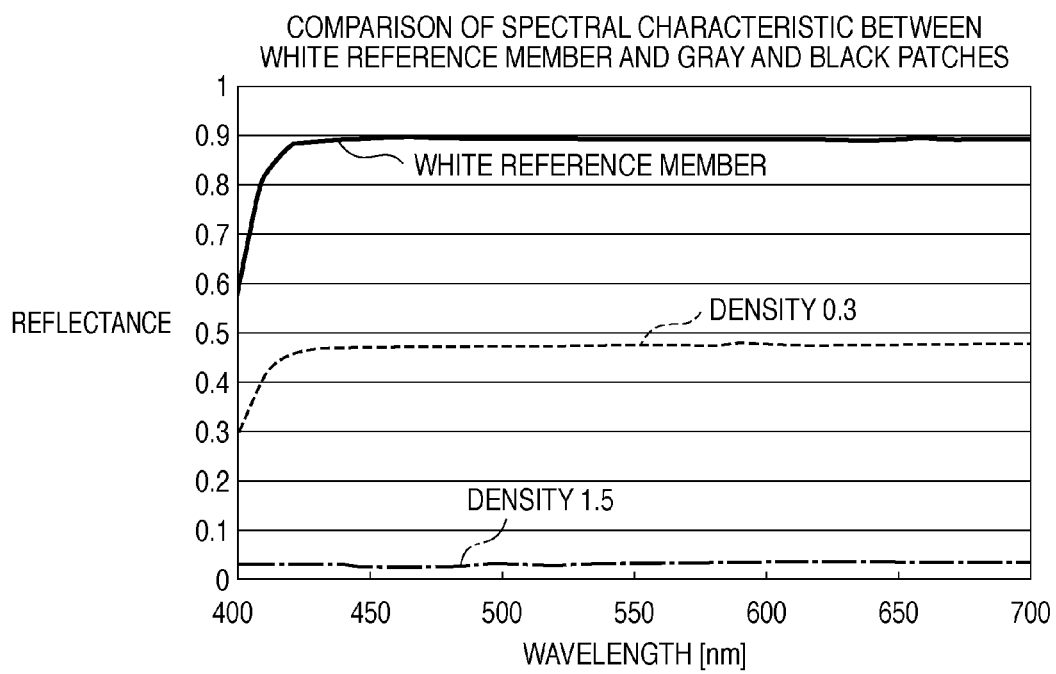
FIG. 11 is a graph for comparing the spectral characteristic of the white reference member shown in FIG. 10 with those of a gray patch having a density of 0.3 and a black patch having a density of 1.5.

FIG. 11 is a graph for comparing the spectral characteristic of the white reference member shown in FIG. 10 with those of a gray patch having a density of 0.3 and a black patch having a density of 1.5. The abscissa represents the wavelength, and the ordinate represents the reflectance.

Referring to FIG. 11, like the spectral characteristic of the white reference member, the reflectance of the gray patch having the density of 0.3 is almost constant at 0.48 over the wavelengths. The reflectance of the black patch having the density of 1.5 is almost constant at 0.03 over the wavelengths.

Results of integration of the spectral characteristic at the density of 0.3 and the spectral characteristic of the optical system are as follows.

The integrated value is 40.0 at image height y=0 (center).
The integrated value is 31.7 at image height y=152.4 (end portion).

That is, the integrated values have a difference.

These values are multiplied by the gain adjustment values $G_0$ and $G_{152.4}$, respectively. The read luminance values are calculated as follows.

The read luminance value is 135 at image height y=0 (center).
The read luminance value is 135 at image height y=152.4 (end portion).

Results of integration of the spectral characteristic at the density of 1.5 and the spectral characteristic of the optical system are as follows.

The integrated value is 2.69 at image height y=0 (center).
The integrated value is 2.13 at image height y=152.4 (end portion).

That is, the integrated values have a small difference.

These values are multiplied by the gain adjustment values $G_0$ and $G_{152.4}$, respectively. The read luminance values are calculated as follows.

The read luminance value is 9 at image height y=0 (center).
The read luminance value is 9 at image height y=152.4 (end portion).

That is, no unevenness in the main-scanning read luminance is generated in a color (a wavelength (color) within the range of 400 nm to 700 nm at which the reflectance is almost constant regardless of its value) very closer to the white reference member concerning the spectral characteristic.

More specifically, no unevenness in the main-scanning read luminance is generated in gray or black even when the gain adjustment values decided based on the white reference member are used.

The gain adjustment values $G_0$ and $G_{152.4}$ are decided to correct the change in the read value of the white reference member depending on the image height. In a color having a spectral characteristic very closer to that of the white reference member, the read luminance change ratio by the image height is almost constant regardless of the reflectance value. For this reason, a desired effect can be obtained by shading correction using the white reference member.

However, when the same calculation as described above is performed for the spectral characteristic of yellow shown in FIG. 6, the integrated values of the spectral characteristics of yellow and the optical system are as follows.

The integrated value is 48.1 at image height y=0 (center).
The integrated value is 33.7 at image height y=152.4 (end portion).

That is, the integrated values corresponding to the respective image heights have a difference.

These integrated values are multiplied by the corresponding gain adjustment values $G_0$ and $G_{152.4}$, respectively, thereby calculating read luminance values.

The read luminance value is 162 at image height y=0 (center).
The read luminance value is 144 at image height y=152.4 (end portion).

That is, the read luminance values corresponding to the image heights have a difference of 18 in level.

The above examination has placed focus on only the gain adjustment values but not taken the offset correction values into consideration. This is because offset correction is done in the OFF state of the light source and not affected by the spectral characteristic of the optical system.

As described above, shading correction using the white reference member can reduce unevenness in the main-scanning read luminance of an achromatic color having a spectral characteristic almost similar to that of the white reference member. As for a chromatic color, however, the shading correction using the white reference member cannot completely correct unevenness in the main-scanning read luminance.

That is, in the image reading apparatus having a wide-angle imaging optical system, unevenness in the main-scanning read luminance remains in a chromatic color even after shading correction using the white reference member.

[Method of Reducing Unevenness in Main-Scanning Read Luminance Generated in Chromatic Color]

To reduce unevenness in main-scanning read luminance generated in a chromatic color, methods of reducing a change in the spectral characteristic of the reading optical system depending on the image height are usable.

For example, one of the methods decreases the angle of view of a read image incident on the reflecting mirror or the imaging mirror. To make the angle of view smaller at an end portion in the main-scanning direction, it is necessary to increase the distance between the mirrors, that is, prolong the optical path. However, to increase the distance between the mirrors, the image reading apparatus needs to be large. Additionally, the members are also expected to be more expensive as the apparatus becomes large. For these reasons, the method cannot meet the requirements of size and cost reduction of the apparatus.

As another method, reference members of the respective colors such as red, green, and blue, or cyan, magenta, and yellow having managed densities are provided in addition to the white reference member, and a shading correction coefficient is changed depending on the color of the original. However, when this method is employed, the number of reference members that require density management increases. A memory for storing shading correction coefficients for the respective colors is also necessary. Also required is a circuit for determining a color on the original. This inevitably increases the cost and size of the apparatus.

To prevent this, the embodiment employs a method of making changes in the spectral characteristics of the reflecting mirror and the imaging mirror depending on the image height smaller in the wavelength band near the peak wavelength of the light source. More specifically, a filter almost without sensitivity at the peak wavelength of the light source is evaporated on the sensor. This method was devised by perceiving that the change in the spectral characteristic of the optical system depending on the image height mostly results from a portion where the peak wavelength of the light source overlaps the changes in the spectral characteristics of the reflecting mirror and the imaging mirror depending on the image height. This reduces unevenness in the main-scanning read luminance of a chromatic color. This method is more advantageous than the above-described methods regarding the cost and size of the apparatus as well.

In this embodiment, a white LED having the spectral characteristic shown in FIG. 4A is used as the light source. The peak wavelength is about 450 nm. As described above, since the spectral characteristics of the reflecting mirror and the imaging mirror change depending on the image height with respect to the peak wavelength of the light source, unevenness in the main-scanning read luminance still occurs in a chromatic color even after shading correction using the white reference member. To cope with this, the changes in the spectral characteristics of the reflecting mirror and the imaging mirror depending on the image height are made smaller at 450 nm, that is, the peak wavelength of the white LED.

The spectral characteristics of the reflecting mirror and the imaging mirror will be described. In general, a mirror is formed by vapor-depositing a thin film of a metal such as aluminum, silver, chromium, or copper on a surface of glass, plastic, or resin. Hence, the spectral characteristic of the mirror changes depending on the type of the vapor-deposited metal.

Figure 12:
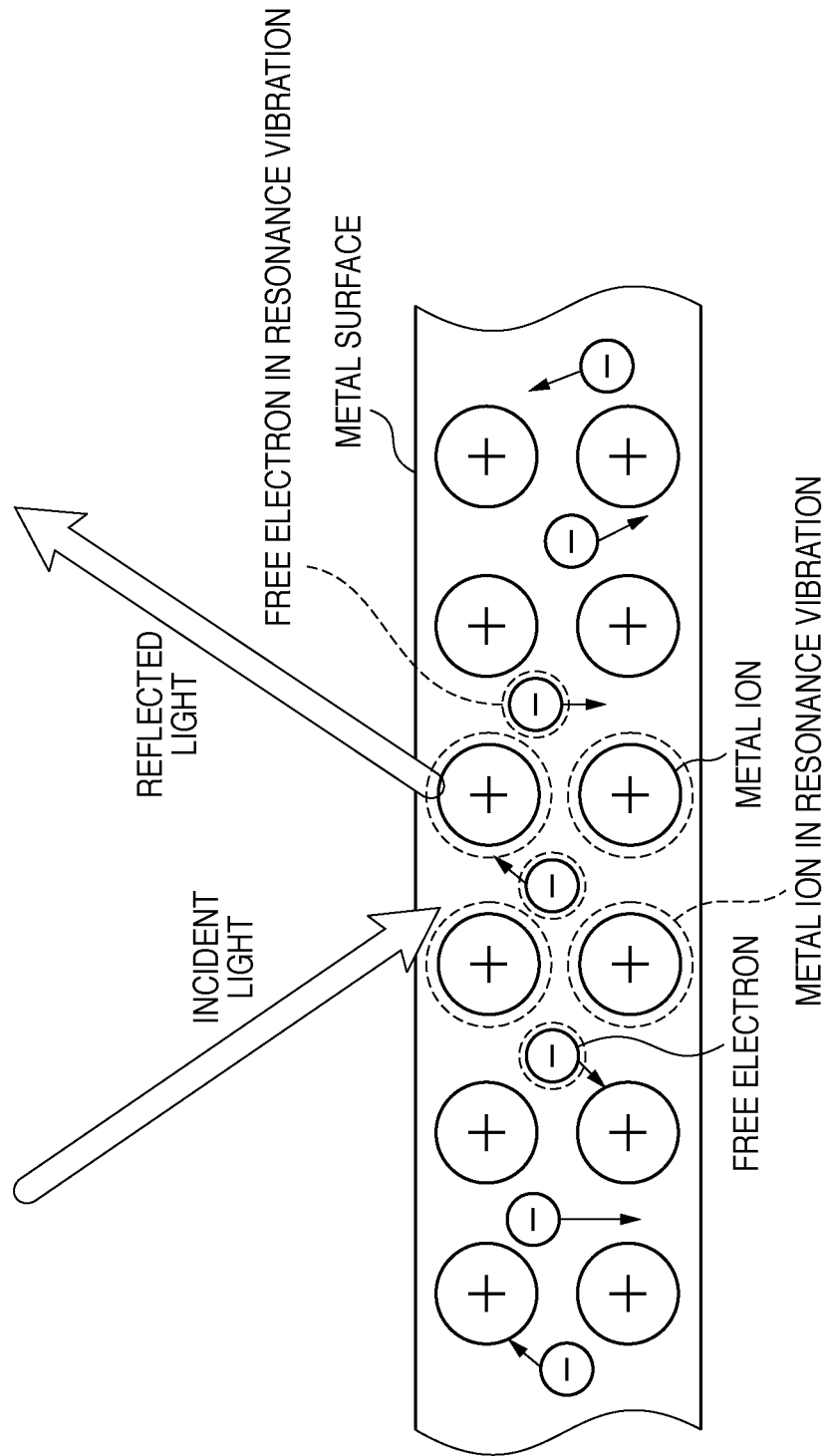
FIG. 12 is a view showing the relationship between incident light and reflected light on a metal surface.

FIG. 12 is a view showing the relationship between incident light and reflected light on a metal surface. When light strikes the metal surface, metal ions or free electrons in the thin film layer of the surface absorb the light energy and cause resonance vibration. The vibration energy is emitted from the metal surface. This is the phenomenon of light reflection from the metal.

Figure 13:
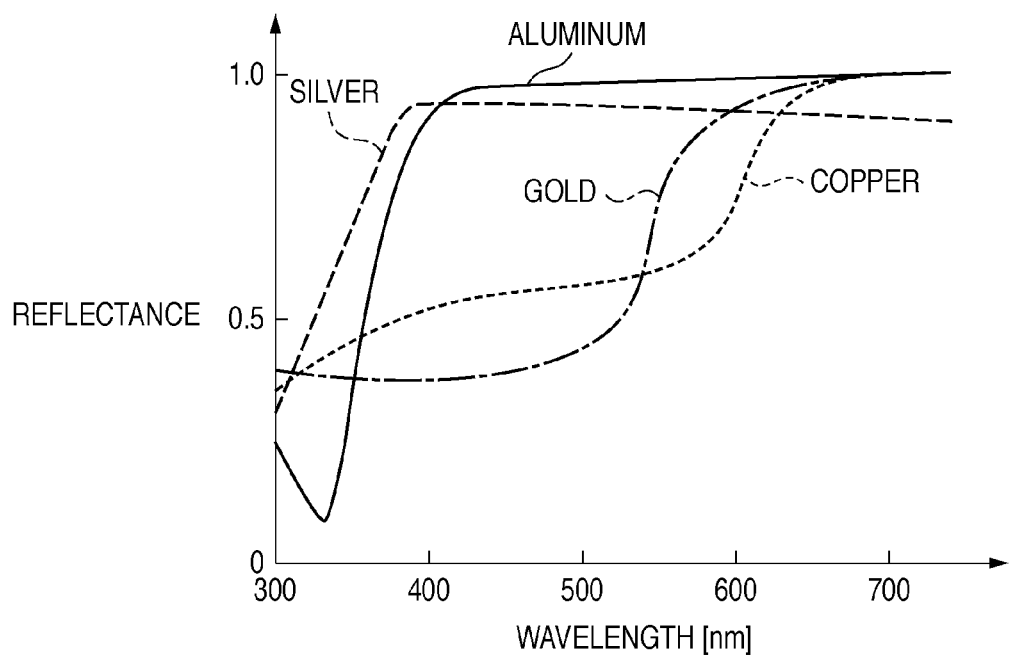
FIG. 13 is a graph showing examples of the spectral characteristics of aluminum, silver, gold, and copper while plotting the wavelength along the abscissa.

FIG. 13 is a graph showing examples of the spectral characteristics of aluminum, silver, gold, and copper. The abscissa represents the wavelength, and the ordinate represents the reflectance.

The reflectances of silver are 97% at 450 nm, 98% at 550 nm, and 98% at 650 nm. That is, silver has very high reflectances over the wavelengths throughout the visible light range. For this reason, silver is the most appropriate metal to be vapor-deposited for a mirror. However, since silver is an expensive material, aluminum is often used for a mirror.

The reflectances of aluminum are 92% at 450 nm, 91% at 550 nm, and 90% at 650 nm. The reflectance of aluminum is lower than that of silver but almost uniform over the wavelengths throughout the visible light range.

The reflectance of gold is low from the ultraviolet range (on the side of wavelengths shorter than 400 nm) to the wavelength band of blue (400 nm to 500 nm). The reflectance of gold starts rising from the center (550 nm) of the wavelength band of green (500 nm to 600 nm). The reflectance of gold is 98% from the wavelength band of red (600 nm to 700 nm) to the infrared range (on the side of wavelengths longer than 700 nm). That is, since gold mostly reflects light in the wavelength band of green and that of red, the light is observed as a yellowish color.

The reflectance of copper is low from the ultraviolet range to the wavelength band of blue, like gold. Copper has a low reflectance of approximately 70% even in the wavelength band of green but a high reflectance of 93% in the wavelength band of red. Light incident on copper is mostly reflected in the wavelength band of red and therefore observed as a reddish color.

The reflectance can be raised by overcoating the metal film with a multilayered dielectric film of, for example, magnesium fluoride ($MgF_2$) serving as the protective film of the mirror. However, the reflectance depends on the wavelength or the incident angle, as is well known.

Changing the thickness of the vapor-deposited reflecting film enables to shift the whole spectral characteristic of the mirror toward shorter wavelengths. This will be explained below.

Figure 14:
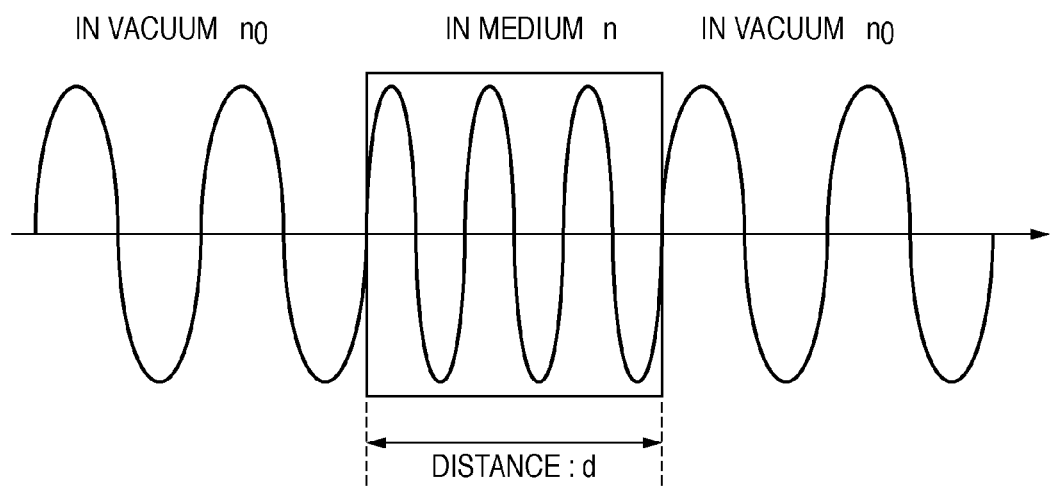
FIG. 14 is a view for explaining light that passes through a medium.

FIG. 14 is a view for explaining light that passes through a medium. The phase velocity of light generally changes depending on a medium to pass it. However, a frequency $v$ of light does not change. Examine a case in which light propagates through the interfaces between vacuum and a medium while becoming incident vertically and causing sine wave oscillation.

Let $n_0$, $\lambda_0$, and $c$ be the refractive index, wavelength, and velocity of light in vacuum. Let $n$, $\lambda$, and $v$ be the refractive index, wavelength, and velocity of light in the medium. Between these parameters, $$n = \frac{c}{v} = \frac{\lambda_0 v}{\lambda v} = \frac{\lambda_0}{\lambda} \qquad (1.1)$$

holds. As shown in FIG. 14, the wavelength $\lambda$ in the medium having the refractive index n is 1/n the wavelength in vacuum. When n>1, the wavelength in the medium is shorter than in vacuum.

Letting d be the distance of the medium having the refractive index n, the number of waves included in the medium is given by $$\frac{d}{\lambda} = \frac{nd}{\lambda_0} \qquad (1.2)$$

This equals the number of waves having the wavelength $\lambda_0$ included within the distance nd. The value nd is called an optical distance or an optical thickness.

Figure 15:
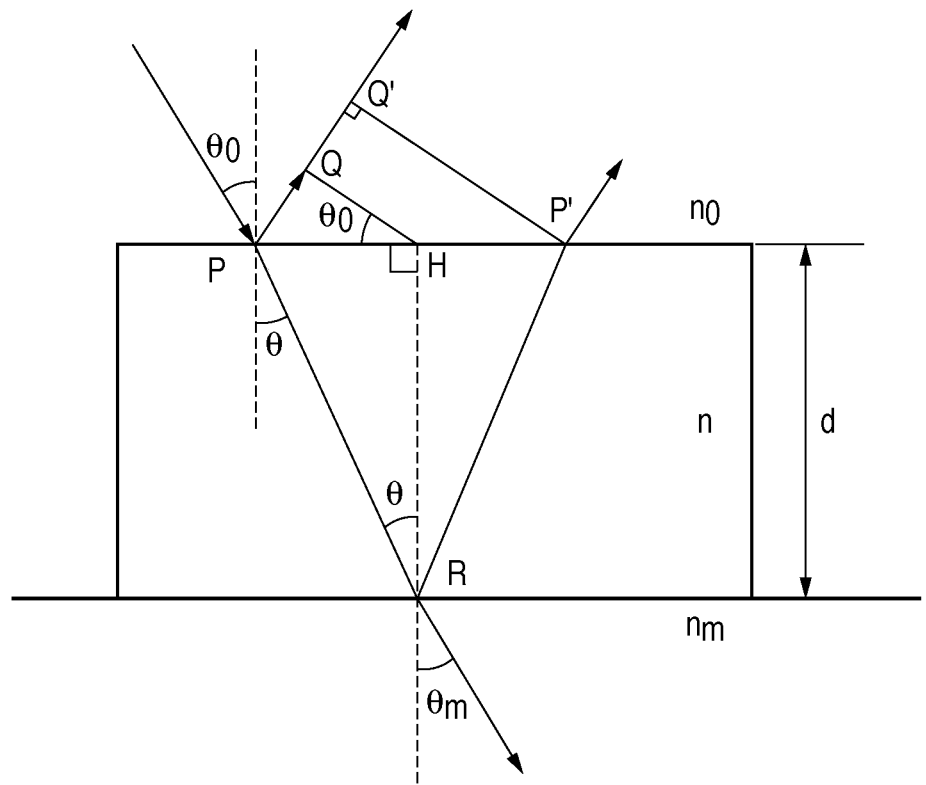
FIG. 15 is a view for explaining an example of light that obliquely becomes incident on a thin film.

FIG. 15 is a view for explaining an example of light that obliquely becomes incident on a thin film. Let $n_0$, $\lambda_0$, and $\theta_0$ be the refractive index, wavelength, and incident angle of light in vacuum. Let $n$, $\lambda$, and $\theta$ be the refractive index, wavelength, and refraction angle of light in the thin film. Let $n_m$, $\lambda_m$, and $\theta_m$ be the refractive index, wavelength, and incident angle of light in the substrate on which the thin film is vapor-deposited.

When light becomes incident obliquely from vacuum onto the thin film, an optical path difference is generated. More specifically, an optical path difference is generated between light reflected by the surface of the thin film (light propagating from a point P to a point Q in FIG. 15) and light which enters and propagates through the thin film and returns into vacuum again upon being reflected by the substrate surface (light reflected at a point R and output to vacuum at a point P' in FIG. 15).

The optical path difference PQ' is given by $$PQ' = nPR - n_0 PQ \quad (1.3)$$
$$= n(PH/\sin\theta) - n_0 PH\sin\theta_0$$
$$= (n/\sin\theta - n_0\sin\theta_0)PH$$
$$= (n/\sin\theta - n_0\sin\theta_0)d\tan\theta$$
$$= (n/\sin\theta - n\sin\theta)d\tan\theta$$
$$= nd(1/\cos\theta - \sin^2\theta/\cos\theta)$$
$$= nd(1 - \sin^2\theta)/\cos\theta$$
$$= nd\cos\theta$$

where conversion is performed using the Snell's law represented by $$n_0 \sin\theta = n \sin\theta \quad (1.3.2)$$

That is, the optical thickness in oblique incidence takes a value obtained by multiplying nd in vertical incidence by cos θ, that is, becomes smaller than in vertical incidence. The optical thickness is smaller in vertical incidence. Note that the spectral characteristic changes as the optical thickness becomes smaller.

Figure 16:
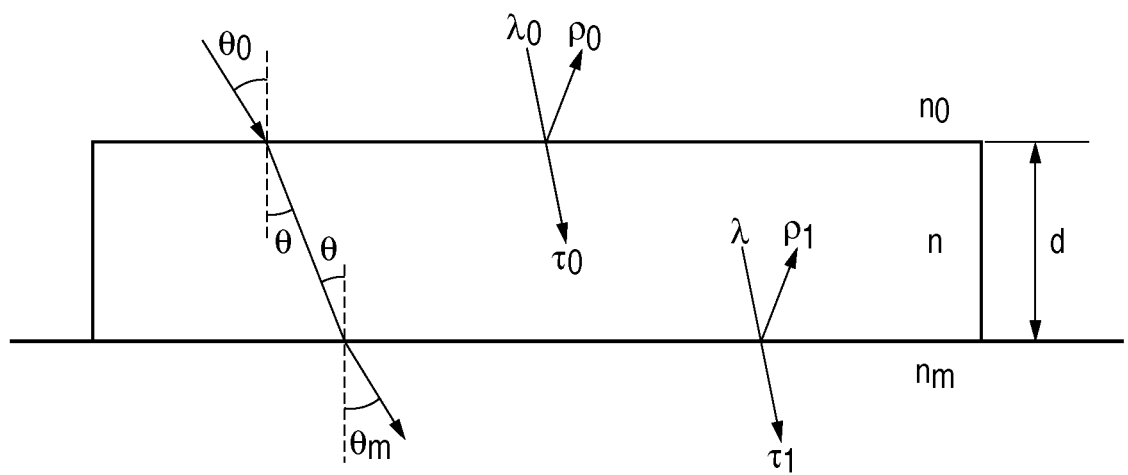
FIG. 16 is a view for explaining Fresnel coefficients at interfaces (between vacuum and the thin film and between the thin film and a substrate) upon oblique incidence on the thin film shown in FIG. 15.

FIG. 16 is a view for explaining Fresnel coefficients at interfaces (between vacuum and the thin film and between the thin film and the substrate) upon oblique incidence on the thin film shown in FIG. 15. In FIG. 16, $\rho_0$ is the Fresnel reflection coefficient upon incidence from vacuum onto the thin film, $\tau_0$ if the Fresnel transmission coefficient upon incidence from vacuum onto the thin film, $\rho_1$ is the Fresnel reflection coefficient upon incidence from the thin film onto the substrate, and $\tau_1$ if the Fresnel transmission coefficient upon incidence from the thin film onto the substrate.

A reflectance $R_f$ in such a single thin film is generally given by $$R_f = \frac{\rho_{0f}^2 + \rho_{1f}^2 + 2\rho_{0f}\rho_{1f}\cos 2\delta}{1 + (\rho_{0f}\rho_{1f})^2 + 2\rho_{0f}\rho_{1f}\cos 2\delta} \quad (1.4)$$

where f is a suffix representing a polarized wave. That is, s and p substituted for f indicate an s-polarized wave and a p-polarized wave, respectively. That is, $\rho_{0s}$ and $\rho_{0p}$ are the Fresnel reflection coefficients of the s-polarized wave and the p-polarized wave, respectively.

$$\rho_{0f} = \frac{\eta_{0f} - \eta_f}{\eta_{0f} + \eta_f} \quad (1.5)$$

$$\rho_{1f} = \frac{\eta_f - \eta_{mf}}{\eta_f + \eta m_f}$$

where $\eta_{0f}$, $\eta_f$, and $\eta_{mf}$ are defined by $$\eta_{0s} = n_0 \cos\theta_0$$

$$\eta_{0p} = n_0/\cos\theta_0$$

$$\eta_s = n \cos\theta$$

$$\eta_p = n/\cos\theta$$

$$\eta_{ms} = n_m \cos\theta_m$$

$$\eta_{mp} = n_m/\cos\theta_m \quad (1.6)$$

where $n_0$, n, and $n_m$ are the refractive indices in vacuum, the thin film, and the substrate, respectively, $\theta_0$ is the incident angle from vacuum to the thin film, θ is the refraction angle from vacuum to the thin film, and $\theta_m$ is the refraction angle from the thin film to the substrate.

The Snell's law holds between the refractive indices and the incident angle.

$$n_0 \sin\theta_0 = n \cos\theta = n_m \cos\theta_m \quad (1.7)$$

In addition, δ in Expression (1.4) represents a phase change in the thin film and is obtained based on Expression (1.3) by $$\delta = \frac{2\pi}{\lambda} nd\cos\theta \quad (1.8)$$

As shown in Expression (1.8), the optical thickness changes depending on the incident angle on the thin film. Additionally, the change in the optical thickness causes a phase change in the thin film. The phase change δ in the thin film affects the reflectance $R_f$ as indicated by Expression (1.4).

Based on the above-described principle, the spectral characteristics of the reflecting mirror and the imaging mirror change in accordance with the image height (incident angle).

This embodiment aims at reducing unevenness in the main-scanning read luminance of a chromatic color, which remains even after shading correction using the white reference member. For this purpose, changes in the spectral characteristics of the reflecting mirror and the imaging mirror depending on the image height are made smaller at 450 nm, that is, the peak wavelength of the white LED.

Especially, in this embodiment, a filter almost without sensitivity at the peak wavelength of the light source is evaporated on the monochrome sensor, thereby reducing unevenness in the main-scanning read luminance of a chromatic color. When adopting a white LED as the light source, a color filter almost without sensitivity at its peak wavelength of 450 nm is evaporated on the sensor.

The color filter to cut off light having a peak wavelength of 450 nm can be implemented by a bandpass filter (BPF). For example, a cutoff wavelength fc on the short wavelength side is set to 475 nm, the cutoff wavelength on the long wavelength side is set to 625 nm, and a bandwidth fw is set to 100 nm. This can be generalized as follows. The cutoff wavelength on the short wavelength side is longer than the peak wavelength of the light source by about 5%. The cutoff wavelength on the long wavelength side is longer than the peak wavelength of the light source by about 40%. The bandwidth of a thus designed color filter is sufficiently wider than that of the G (green) filter used in the 3-line sensor.

Figure 17:
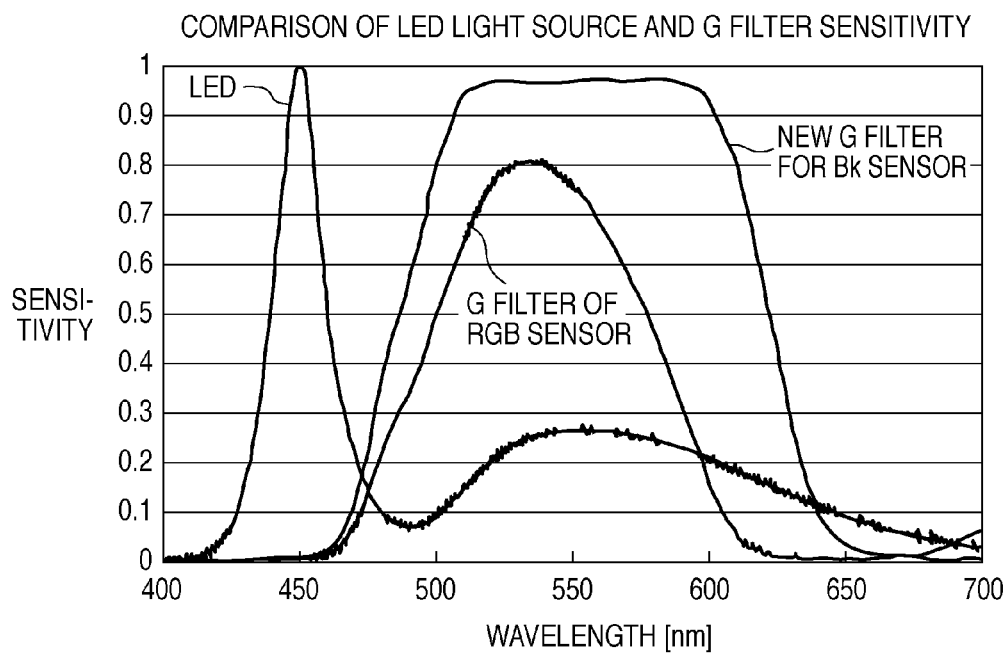
FIG. 17 is a graph showing an example of the spectral transmittance characteristic of a BPF manufactured based on analysis using simulations.

FIG. 17 is a graph showing an example of the spectral transmittance characteristic of a BPF manufactured based on analysis using simulations. The abscissa represents the wavelength, and the ordinate represents the sensitivity. FIG. 17 shows the spectral characteristic of a white LED, the spectral transmittance characteristic of a G filter, and the spectral transmittance characteristic of a broadband G filter newly manufactured for the monochrome sensor.

As shown in FIG. 17, the G filter for a color sensor and the broadband G filter for a monochrome sensor have the same characteristic in that neither has sensitivity at the peak wavelength (450 nm) of the white LED.

However, if the G filter for a color sensor is directly applied to a monochrome sensor, the sensitivity of the monochrome sensor lowers. To prevent this, the monochrome sensor of this embodiment adopts a new broadband G filter having a bandwidth wider than that of the conventional G filter.

Figure 18:
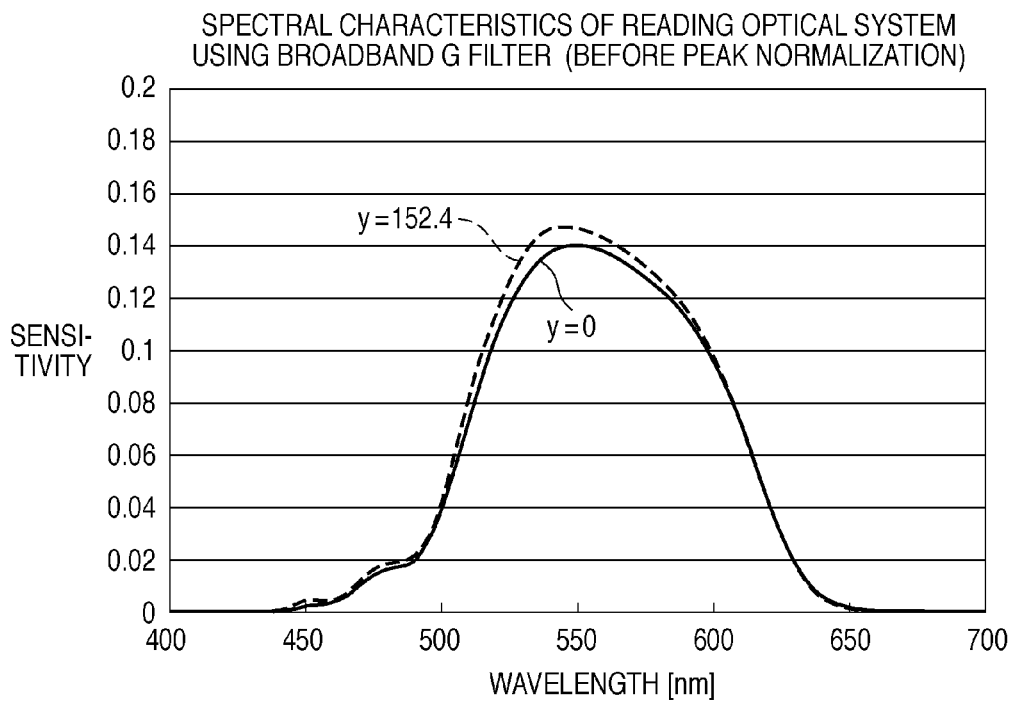
FIG. 18 is a graph showing the spectral characteristics of a reading optical system including a monochrome sensor with a broadband G filter evaporated on it

FIG. 18 is a graph showing the spectral characteristics of a reading optical system including a monochrome sensor with a broadband G filter evaporated on it. The abscissa represents the wavelength, and the ordinate represents the sensitivity. The sensitivity the reading optical system has for each wavelength at image height y=0 is compared with that at image height y=152.4.

Place focus on 550 nm that is the peak wavelength of the whole reading optical system. The sensitivities are about 14% at image height y=0 and 14.7% at image height y=152.4. The sensitivity (the rate of output to input) changes by about 5% depending on the image height, as is apparent.

As described above, the change in the spectral characteristic of the reading optical system including the reflecting mirrors and imaging mirrors depending on the image height shown in FIG. 5A is about 13%. That is, the reading optical system of this embodiment reduces the ratio of the change in the spectral characteristic to ½ or less.

Figures 19, 20:
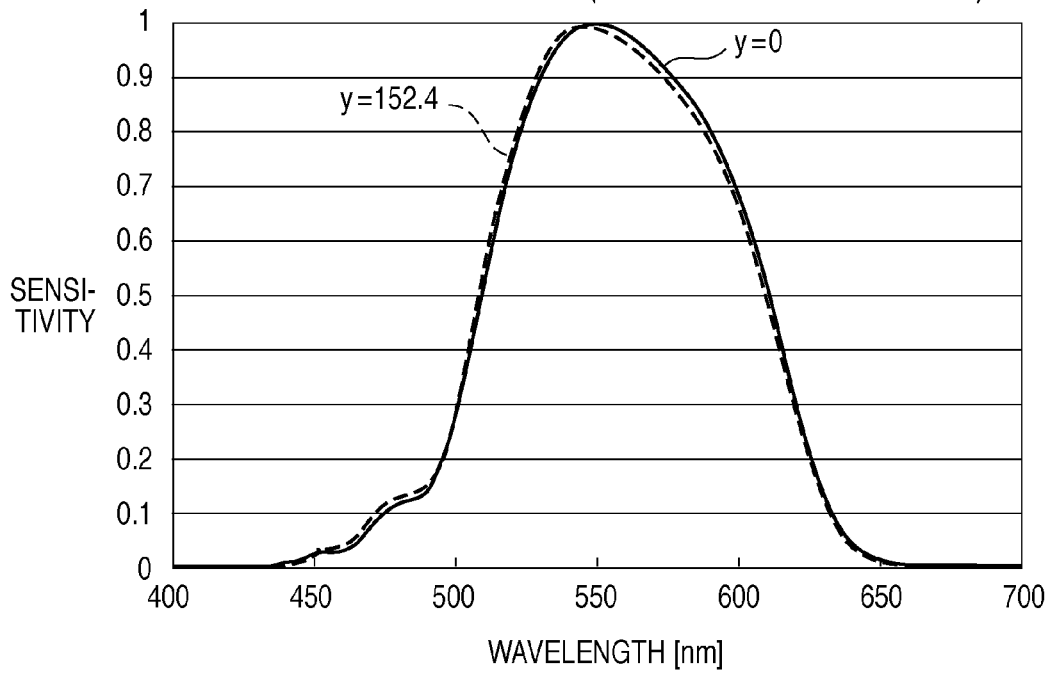
FIG. 19 is a graph showing a spectral characteristic normalized based on the peak wavelength.
FIG. 20 is a table showing unevenness in the main-scanning read luminance obtained by causing the reading optical system to read the color bar shown in FIG. 7 which has a uniform density in the main-scanning direction.

FIG. 19 is a graph showing a spectral characteristic normalized based on the peak wavelength. The abscissa represents the wavelength, and the ordinate represents the sensitivity. In this example, the spectral characteristics of the reading optical system including a monochrome sensor with a broadband G filter evaporated on it are normalized to the sensitivity at the peak wavelength of 550 nm. This aims at observing the influence of the change in the sensitivity at the peak wavelength on the entire spectral characteristic.

After the normalization to the sensitivity near the peak wavelength of 550 nm, the sensitivity at 450 nm, that is, the peak wavelength of the light source rarely changes depending on the image height. More specifically, the whole optical system is rarely affected by changes in the spectral reflection characteristics of the reflecting mirror and imaging mirror depending on the image height, as can be seen.

That is, employing the broadband G filter according to this embodiment makes it possible to reduce the influence of changes in the spectral characteristics of the reflecting mirror and imaging mirror depending on the image height and also reduce the influence not only on achromatic colors but also on chromatic colors.

FIG. 20 is a table showing unevenness in the main-scanning read luminance obtained by causing the reading optical system to read the color bar shown in FIG. 7 which has a uniform density in the main-scanning direction. The optical system before improvement employs reflecting mirrors and imaging mirrors having the spectral reflection characteristics shown in FIGS. 4B and 4C. The optical system after improvement includes a broadband G filter having a spectral transmittance characteristic shown in FIG. 17.

Comparison will first be made for yellow having large unevenness in the main-scanning read luminance. Before improvement of the reading optical system, the luminance levels are 137 at an end portion in the main-scanning direction and 159 at the central portion. The difference is 22 in level. After improvement of the reading optical system, the luminance level difference between the end portion and the central portion improves to 5. That is, the luminance level improves by 17.

Next, the unevenness in the main-scanning read luminance of magenta before improvement of the reading optical system is compared with that after improvement. The luminance level differences between the end portion and the central portion in the main-scanning direction are 8 before improvement and 3 after improvement. That is, the luminance level improves by 5.

Finally, the unevenness in the main-scanning read luminance of cyan before improvement of the reading optical system is compared with that after improvement. The luminance level differences between the end portion and the central portion in the main-scanning direction are 9 before improvement and 5 after improvement. That is, the luminance level improves by 4.

As described above, the unevenness in the main-scanning read luminance of an achromatic color can almost be eliminated by shading correction using a white reference member. For this reason, adopting the reading optical system according to this embodiment reduces the unevenness in the main-scanning read luminance of a chromatic color. That is, the unevenness in the main-scanning read luminance can be reduced for both an achromatic color and a chromatic color.

Especially, employing, for the monochrome sensor, a color filter having a bandwidth different from that of a color filter used in a color sensor solves the problem of degradation in the sensitivity of the monochrome sensor.

Note that the average luminance before improvement and that after improvement are different in FIG. 20 because the broadband G filter is added to the monochrome sensor. The read luminance has a value obtained by multiplying the integrated value of the spectral characteristic of the reading optical system and that of a color patch as the reading target by a gain adjustment value and adding an offset adjustment value to the product. For this reason, if the spectral characteristic of the whole reading optical system changes, the read luminance of the same color patch also changes.

Finally, the reason why the difference between the spectral characteristic of the image reading apparatus at an end portion in the main-scanning direction and that at the central portion in the main-scanning direction can fall within 5% at the peak wavelength of the light source will be explained.

FIG. 21 is a table showing the color difference $\Delta E^*_{ab}$ and the extent regarding human sensation. This table was created based on a color difference material of Japan Color Research Institute. Referring to FIG. 21, for "grade A color tolerance" where two samples are generally recognized as the same color, the color difference $\Delta E^*_{ab}$ is limited to about 3.

It is therefore required to reduce unevenness in the main-scanning read color upon color reading based on color difference $\Delta E^*_{ab}=3$. To what extent the changes in the spectral characteristics of the reflecting mirror and the imaging mirror depending on the image height should be suppressed at the peak wavelength of the white LED serving as the light source, that is, 450 nm will be explained.

Figures 22, 23:
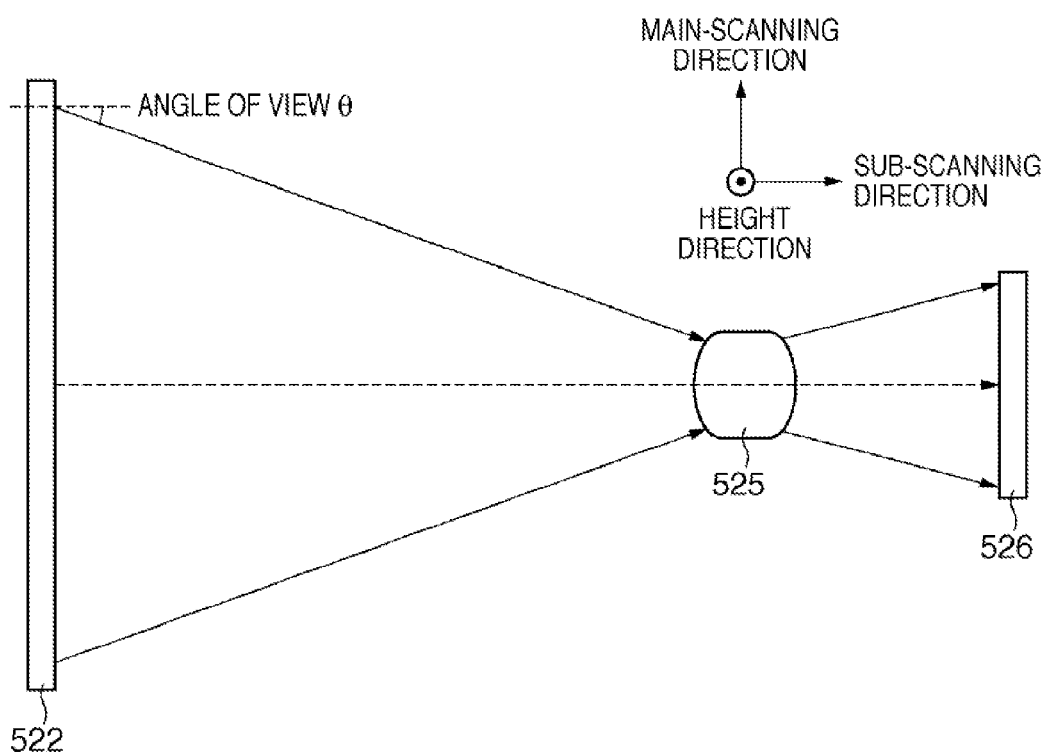
FIG. 22 is a table showing the transition of a main-scanning color difference $\Delta Eab$ generated by a change in the spectral characteristic of the reading optical system depending on the image height.
FIG. 23 is a plan view for explaining the angle of view in an image reading apparatus.
Figure 24:
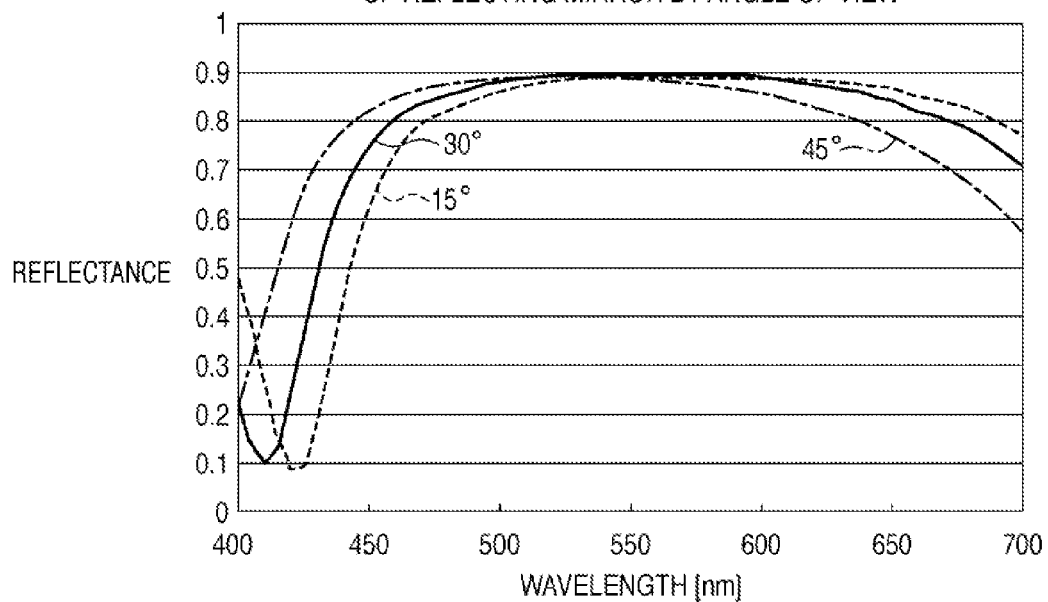
FIG. 24 is a graph showing the spectral characteristics of a reflecting mirror corresponding to different angles of view.

FIG. 22 is a table showing the transition of a main-scanning color difference ΔEab generated by a change in the spectral characteristic of the reading optical system depending on the image height. The extent of a color difference corresponding to a specific extent of the change in the spectral characteristic of the reading optical system depending on the image height at the peak wavelength of the white LED serving as the light source, that is, 450 nm will be described here. The chart of the evaluation target contains a total of six colors. The six colors are Y (yellow), M (magenta), and C (cyan) having the spectral reflectance characteristics shown in FIG. 6 and R (red), G (green), and B (blue) having the spectral reflectance characteristics shown in FIG. 21.

When the spectral change ratio is 15%, the color difference $\Delta E^*_{ab}$ of yellow is 8.59, which is largest in all colors and much larger than target color difference $\Delta E^*_{ab}=3$. Even when the spectral change ratio lowers to 10%, the color difference $\Delta E^*_{ab}$ of yellow is 5.39, which is still largest and cannot achieve target color difference $\Delta E^*_{ab}=3$. When the spectral change ratio is 5%, the color difference $\Delta E^*_{ab}$ of yellow is 2.16, which is still largest but achieves target color difference $\Delta E^*_{ab}=3$.

Hence, to achieve color difference $\Delta E^*_{ab}=3$, the spectral sensitivity characteristic of the reading optical system needs to change depending on the image height within the range of 5% at the peak wavelength of the white LED serving as the light source, that is, 450 nm.

As described above, the embodiment employs an imaging optical system which is adjusted to have a difference of 5% or less between the spectral sensitivity characteristic (the rate of output to input) at an end portion in the main-scanning direction of the image reading apparatus and the spectral sensitivity characteristic (the rate of output to input) at the central portion in the main-scanning direction at the peak wavelength of the light source. This suppresses an increase in the size and cost of the apparatus, an increase in the number of reference members, and complication of a circuit arrangement. It is also possible to reduce unevenness in the main-scanning read luminance of a chromatic color. However, the imaging optical system of this embodiment may be applied to a large apparatus or employed together with a plurality of reference members of different colors.

The peak wavelength of a white LED which is particularly promising as a next-generation light source is 450 nm. For this reason, it can adopt an imaging optical system which is adjusted to have a difference of 5% or less between the spectral characteristic (the rate of output to input) at the central portion and that at an end portion in the main-scanning direction at 450 nm.

As described above, the monochrome sensor employs a color filter which makes a change in the sensitivity at the peak wavelength of the light source sufficiently small without depending on the image height. This reduces degradation in image quality (S/N ratio mainly) while reducing unevenness in the luminance. For example, it is only necessary that the cutoff wavelength and bandwidth of the color separation unit are designed to almost cut off light at the peak wavelength of the light source, and the bandwidth is wider than that of the green color filter. This improves image quality and unevenness in the luminance as compared to a monochrome sensor which directly uses the G filter employed in the conventional RGB color sensor.

By the way, when the cutoff wavelength on the short wavelength side of the broadband G filter is longer than the peak wavelength of the light source by about 5%, and the cutoff wavelength on the long wavelength side is longer than the peak wavelength of the light source by about 40%, the spectral characteristic difference of the sensitivity of the monochrome sensor between the optical path via the central portion and the optical path via the end portion of the imaging mirror and the broadband G filter generally falls within 5%. For example, when a white LED having a peak wavelength of 450 nm is used, a color filter whose cutoff wavelength on the short wavelength side is 475 nm and whose cutoff wavelength on the long wavelength side is 625 nm is evaporated on the monochrome sensor.

The reflecting surface of the imaging mirror that forms part of the imaging unit can be an off axial reflecting surface. The off axial reflecting surface has a curvature and a reflecting direction different from the reference optical axis line incident direction. Hence, the off axial reflecting surface is advantageous for size reduction of the image reading apparatus.

This embodiment is particularly effective in an image reading apparatus which performs shading correction using only the white reference member. Generally, shading correction using only the white reference member is insufficient for a chromatic color. However, according to this embodiment, the difference between the spectral sensitivity characteristic of optical path via an end portion of the imaging mirror and the broadband G filter and that via the central portion of the imaging mirror and the broadband G filter is 5% or less at the peak wavelength of the light source. This enables sufficient shading correction even for a chromatic color. If there is white reference member, reference member of other colors can be omitted.

To downsize the image reading apparatus, a moving unit which integrates the light source, the imaging unit, and the photoelectric conversion unit can be employed. However, employing such a moving unit increases the difference in the angle of view between an end portion and the central portion in the main-scanning direction and also readily generates the difference in the spectral characteristic. However, according to this embodiment, the difference between the spectral sensitivity characteristic at an end portion in the main-scanning direction and that at the central portion is 5% or less at the peak wavelength of the light source. It is therefore possible to suppress luminance unevenness even when employing such a moving unit.

Note that luminance unevenness in the image reading apparatus directly results in color unevenness in an image forming apparatus such as a copying machine. Hence, color unevenness in the image forming apparatus can be reduced by reducing luminance unevenness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-291499 filed Nov. 13, 2008 which is hereby incorporated by reference herein in its entirety.

What is claimed is:

1. An image reading apparatus comprising:
   a light source which irradiates an original with light;
   an imaging unit which images reflected light from the original via a reflecting optical system, wherein the reflected light is reflected from the original; and
   a photoelectric conversion unit which includes a plurality of photoelectric conversion elements arrayed in a predetermined direction and which converts, into an electrical signal, the reflected light imaged by said imaging unit, wherein said photoelectric conversion unit includes a plurality of photoelectric conversion elements for monochrome reading,
   wherein an optical filter is provided on said photoelectric conversion elements for monochrome reading,
   wherein each of said reflecting optical system and said optical filter has an end portion and a central portion in the predetermined direction, and
   wherein said optical filter suppresses light at a peak wavelength of said light source such that a difference between a first sensitivity in percent of an optical path via the end portion of said reflecting optical system and said optical filter and a second sensitivity in percent of an optical path via the central portion of said reflecting optical system and said optical filter is equal to or less than 5%.

2. The apparatus according to claim 1, wherein said photoelectric conversion unit includes a plurality of photoelectric conversion elements for color reading,
wherein said optical filter has a passing wavelength band, and
wherein the passing wavelength band of said optical filter provided on said plurality of photoelectric conversion elements for monochrome reading is wider than a passing wavelength band of a green filter provided in said plurality of photoelectric conversion elements for color reading.

3. The apparatus according to claim 1, wherein of a cutoff wavelength of the optical filter for monochrome reading, a cutoff wavelength on a short wavelength side is longer than the peak wavelength of said light source by about 5%, and a cutoff wavelength on a long wavelength side is longer than the peak wavelength of said light source by about 40%.

4. The apparatus according to claim 3, wherein the peak wavelength of said light source is 450 nm, the cutoff wavelength on the short wavelength side is 475 nm, and the cutoff wavelength on the long wavelength side is 625 nm.

5. The apparatus according to claim 1, wherein a reflecting surface of an imaging mirror which forms part of the reflecting optical system is an off axial reflecting surface.

6. The apparatus according to claim 1, further comprising:
a white reference member; and
a shading correction unit which performs shading correction using an electrical signal generated by causing said photoelectric conversion unit to convert light from said white reference member received via said imaging unit.

7. The apparatus according to claim 6, further comprising a moving unit on which said light source, said imaging unit, and said photoelectric conversion unit are mounted and which moves in a direction perpendicular to the predetermined direction.

8. An image forming apparatus comprising:
the image reading apparatus of claim 1; and
an image forming unit which receives an electrical signal representing an image of an original from said image reading apparatus and forms an image.

* * * * *